(12) United States Patent
Santha

(10) Patent No.: US 9,315,962 B2
(45) Date of Patent: Apr. 19, 2016

(54) FIBER BLOCK PLANTING SYSTEM

(71) Applicant: B. Lanka Santha, McDonough, GA (US)

(72) Inventor: B. Lanka Santha, McDonough, GA (US)

( * ) Notice: Subject to any disclaimer, the term of this patent is extended or adjusted under 35 U.S.C. 154(b) by 0 days.

(21) Appl. No.: 14/594,931

(22) Filed: Jan. 12, 2015

(65) Prior Publication Data

US 2015/0240438 A1 Aug. 27, 2015

Related U.S. Application Data

(60) Provisional application No. 61/966,493, filed on Feb. 24, 2014.

(51) Int. Cl.
*E02B 3/12* (2006.01)

(52) U.S. Cl.
CPC ...................................... *E02B 3/125* (2013.01)

(58) Field of Classification Search
CPC ........... E02B 3/12; E02B 3/122; E02B 3/125; E02D 17/20; E02D 17/202; E02D 17/205
USPC ................ 47/32.7, 65.5–65.8, 73, 74, 78, 56; 405/15–17, 19, 302.4, 30.26, 302.7
See application file for complete search history.

(56) References Cited

U.S. PATENT DOCUMENTS

| | | | |
|---|---|---|---|
| 3,973,355 A * | 8/1976 | McKenzie | 47/59 R |
| 4,434,576 A * | 3/1984 | Sowerwine | 47/39 |
| 4,926,587 A * | 5/1990 | van Wingerden | 47/85 |
| 4,960,349 A | 10/1990 | Willibey et al. | |
| 5,091,247 A | 2/1992 | Willibey et al. | |
| 5,161,917 A | 11/1992 | Papetti | |
| 5,309,673 A * | 5/1994 | Stover et al. | 47/59 R |
| 5,338,131 A * | 8/1994 | Bestmann | 405/24 |
| 5,425,597 A | 6/1995 | Bestmann | |
| 5,595,458 A | 1/1997 | Grabhorn | |
| 5,605,416 A | 2/1997 | Roach | |
| 5,641,244 A | 6/1997 | Bestmann | |
| 5,651,641 A | 7/1997 | Stephens et al. | |
| 5,658,096 A | 8/1997 | Von Kanel | |
| 5,678,954 A | 10/1997 | Bestmann | |
| 5,735,640 A | 4/1998 | Meyer et al. | |
| 5,951,202 A | 9/1999 | Brown | |
| 5,997,213 A | 12/1999 | Dennis et al. | |
| 6,109,835 A | 8/2000 | Grabhorn | |
| 6,127,027 A * | 10/2000 | Nogami et al. | 428/220 |
| 6,168,349 B1 | 1/2001 | Perslow et al. | |
| 6,234,721 B1 | 5/2001 | Cronkhite et al. | |
| 6,267,533 B1 | 7/2001 | Bourg | |
| 6,547,493 B2 * | 4/2003 | Spangler et al. | 405/302.6 |
| 6,616,383 B2 | 9/2003 | Janz | |

(Continued)

FOREIGN PATENT DOCUMENTS

EP 0480890 A1 4/1992
JP 359126824 A 7/1984

(Continued)

*Primary Examiner* — Tara M. Pinnock
(74) *Attorney, Agent, or Firm* — McGurk Intellectual Property Advisors

(57) ABSTRACT

A fiber block planting segment suitable for controlling erosion and stabilizing soil is described that comprises an elongated fiber block formed of a densely packed elongated thick fibrous material having at least one channel formed therein for receiving a plant to be planted in the soil. The fiber block is enclosed in a sleeve or wrap of fiber mesh. The fiber block and mesh can be made of coir fibers.

15 Claims, 30 Drawing Sheets

(56) References Cited

U.S. PATENT DOCUMENTS

| | | |
|---|---|---|
| 6,709,202 B2 | 3/2004 | Spangler et al. |
| 6,893,193 B2 | 5/2005 | Santha |
| 7,029,208 B1 | 4/2006 | Santha |
| 8,740,503 B1 * | 6/2014 | Tyler .................... 405/264 |
| 2002/0073616 A1 * | 6/2002 | Pelton .................... 47/66.7 |
| 2003/0017000 A1 * | 1/2003 | Jansson .................... 405/16 |
| 2003/0143026 A1 * | 7/2003 | Santha .................... 405/15 |
| 2004/0005198 A1 * | 1/2004 | Spangler et al. ........... 405/302.6 |

FOREIGN PATENT DOCUMENTS

| | | |
|---|---|---|
| JP | 403055316 A | 3/1991 |
| JP | 403233021 A | 10/1991 |
| JP | 406212609 A | 8/1994 |

\* cited by examiner

FIBER BLOCK PLANTING SYSTEM

CROSS REFERENCE TO RELATED APPLICATIONS

This application claims priority to U.S. Provisional Patent Application Ser. No. 61/966,493, entitled "Effective Method To Plant Live Plants On Stream Bank Restoration Sites" filed Feb. 24, 2014 and which is hereby incorporated by reference in its entirety herein to provide continuity of disclosure.

BACKGROUND

Urban development has led to construction of an ever increasing number of impervious solid surfaces, such as parking lots and paved roads among other man-made structures, that impede the natural watershed's ability to absorb and filter rainwater carrying silt from soil erosion and other pollutants before it runs off into streams and other waterways. This unfiltered runoff harms the environment by increasing pollution levels in the waterways within the watershed. The increased runoff also increases the danger of flash flooding and flows through the watershed at increased velocities. The faster the runoff flows through existing waterways and the higher the volume of the runoff, the more the runoff erodes the banks of the waterways and the more the runoff harms the ecosystem of the watershed. Additionally, severe washouts along the banks of the eroded waterway may damage property located near the banks. Consequently, there is a need for a system that provides for remediation or protection of shorelines and banks.

SUMMARY

The present disclosure encompasses a fiber block planting system for stabilizing a shoreline or waterway bank comprising a fiber block planting segment that comprises an elongated fiber block comprising a top surface, a front surface, a rear surface, a bottom surface, a male end and a female end, wherein the elongated fiber block further comprises a plurality of channels formed therein, wherein each channel of the plurality of channels extends through the elongated fiber block and is open to at least two separate surfaces selected from the top surface, the front surface, the rear surface, and the bottom surface. The fiber block planting segment also comprises a sleeve of fiber mesh encasing at least a portion of the elongated fiber block. The fiber block planting segment of the system further comprises an anchor flap extending from the sleeve. The system also can comprise a plant disposed in at least one of the plurality of channels, with a top portion of the plant extending from one surface of the fiber block and a bottom portion of the plant extending form another surface of the fiber block. The system further comprises a channel plug removably disposed in at least one channel of the plurality of channels, wherein the channel plug can comprise a natural fiber, such as coir, which can be the fiber from which the fiber block is formed.

The fiber block planting system further can comprise a second fiber block planting segment, wherein the second fiber block planting segment comprises a second elongated fiber block comprising a second top surface, a second front surface, a second rear surface, and a second bottom surface, a second male end and a second female end, wherein the second elongated fiber block further comprises a second plurality of channels formed therein, wherein each channel of the second plurality of channels extends through the second elongated fiber block and is open to two separate surfaces selected from the second top surface, the second front surface, the second rear surface, and the second bottom surface; and, a second sleeve of fiber mesh encasing at least a portion of the second elongated fiber block, wherein the male end of the fiber block planting segment is joined to the second female end of the second fiber block planting segment. This system further can comprise a plant disposed in at least one channel of at least one of the first and the second plurality of channels. In another aspect, at least one channel of the plurality of channels can open to both the top surface and the bottom surface of the elongated fiber block. In yet another aspect, at least one channel of the plurality of channels can open to both the front surface and the rear surface of the elongated fiber block. In still a further aspect, a first channel of the plurality of channels can open to both the front surface and the rear surface of the elongated fiber block and a second channel of the plurality channels can open to both the top surface and the bottom surface of the elongated fiber block. In another aspect, the first channel can be aligned perpendicular to the second channel. In still another aspect, the first channel can be aligned perpendicular to the top surface of the fiber block. In this configuration of the system, the second channel also can be aligned perpendicular to the front surface of the fiber block.

The present disclosure also encompasses a fiber block planting system for stabilizing a shoreline or waterway bank comprising a fiber block planting segment comprising an elongated fiber block comprising a top surface, a front surface, a rear surface, a bottom surface, a male end and a female end, wherein the elongated fiber block further comprises a plurality of channels formed therein, wherein each channel of the plurality of channels extends through the elongated fiber block and is open to at least two separate surfaces selected from the top surface, the front surface, the rear surface, and the bottom surface. The fiber block planting segment also comprises a plurality of fiber channel plugs, wherein each channel plug of the plurality of channel plugs is removably disposed within one channel of the plurality of channels; and a sleeve of fiber mesh encasing at least a portion of the elongated fiber block, wherein at least one end of the sleeve is open. In this system, the fiber block and the plurality of fiber channel plugs can comprise coir fiber. The system also can comprise a second fiber block planting segment, wherein the second elongated fiber block planting segment comprises a second elongated fiber block comprising a second top surface, a second front surface, a second rear surface, and a second bottom surface, a second male end and a second female end, wherein the second elongated fiber block further comprises a second plurality of channels formed therein, wherein each channel of the second plurality of channels extends through the second elongated fiber block and is open to two separate surfaces selected from the second top surface, the second front surface, the second rear surface, and the second bottom surface. The second fiber block planting system also comprises a second sleeve of fiber mesh encasing at least a portion of the second elongated fiber block, and wherein the male end of the fiber block is aligned adjacent the second female end of the second fiber block planting segment and the second sleeve encases a portion of the male end of the fiber block. The system also can comprise a plant disposed in at least one channel of the second plurality of channels. In one aspect, at least one channel of the plurality of channels can open to both the top surface and the bottom surface of the elongated fiber block. In another aspect, at least one channel of the plurality of channels can open to both the front surface and the rear surface of the elongated fiber block. In yet another aspect, a first channel of the plurality of channels can open to both the front surface and the rear surface of the elongated fiber block and a second channel of the plurality channels can open to both the top surface and the bottom surface of the elongated fiber block. In still a further aspect, the first channel can be aligned perpendicular to the second channel. In yet another aspect, the first channel can be aligned perpendicular to the top surface of the fiber block. In another aspect, the second channel can be aligned perpendicular to the front surface of the fiber block.

The present disclosure also encompasses a method of stabilizing a shoreline or waterway bank, comprising the step of positioning a first fiber block planting segment adjacent a shoreline or a waterway bank, the first fiber block planting segment comprising an elongated first fiber block defining a first top surface, a first bottom surface, a first front surface, a first rear surface, a first male end portion, and a first female end portion disposed opposite the first male end portion, wherein the fiber block further comprises a first plurality of channels formed therein, wherein each channel of the first plurality of channels extends between and opens at two surfaces of the first top surface, the first bottom surface, the first front surface and the first rear surface, a first plurality of channel plugs, wherein each channel plug of the first plurality of channel plugs is removably disposed in one channel of the first plurality of channels, a first mesh sleeve encasing at least a portion of the first fiber block. The method also comprises the step of positioning a second fiber block planting segments adjacent the shoreline or waterway bank, the second fiber block planting segment comprising an elongated second fiber block defining a second top surface, a second bottom surface, a second front surface, a second rear surface, a second male end portion, and a second female end portion disposed opposite the second male end portion, wherein the second fiber block comprises a second plurality of channels formed therein, wherein each channel of the second plurality of channels extends between and opens at two surfaces of the second top surface, the second bottom surface, the second front surface and the second rear surface, a second plurality of channel plugs, wherein each channel plug of the second plurality of channel plugs is removably disposed in one channel of the second plurality of channels, a second mesh sleeve encasing at least a portion of the second fiber block. The method further comprises the step of mating the second male end portion of the second fiber block to the first female end portion of the first fiber block, and the step of removing at least one channel plug of the first plurality and the second plurality of channel plugs from at least one channel of the first plurality and the second plurality of channels; and the step of inserting a plant into the channel from which the channel plug was removed. The method also can comprise the step of anchoring both the first and the second fiber block plant segments to the shoreline or waterway bank.

These and other aspects of the present disclosure are set forth in greater detail below and in the drawings for which a brief description is provided as follows.

DETAILED DESCRIPTION

The present disclosure encompasses fiber block planting systems and segments therefor for lining lake or ocean shorelines or the banks of streams or rivers to control erosion of the soil near the water's edge and to promote growth of environmentally friendly vegetation near the waterline and to provide a base in which plants can be planted along the respective shoreline or bank. The present disclosure refers in detail below to various embodiments of fiber block planting segments and systems, which are illustrated in the accompanying drawings. The fiber block planting segments described herein can be used as components of a fiber block planting system to stabilize a shoreline or waterway bank by providing support for and preventing erosion of the soil behind the fiber block planting system and a base for planting plants along the bank or shoreline. Wherever possible, the application uses the same reference numbers throughout the drawings to refer to the same or similar items.

The fiber block planting systems encompassed by the present disclosure can be made of natural materials that are ecologically friendly and that can aid in the protection the shoreline or waterway bank against erosion. The fiber block planting systems can promote growth of vegetation along the shoreline or waterway bank, and can be anchored in place with few, if any, separate anchoring structures. Because the fiber block planting system is made of natural materials and can aid in controlling erosion, it can be installed adjacent to water to protect as much of the shoreline or waterway bank from erosion as is desired. The natural materials of which the fiber block planting system is made can also support vegetation growth in the fiber block planting system itself. Thus, vegetation can be implanted in the fiber block planting system itself in a manner that protects the vegetation from forces of erosion and accelerates its growth along the shoreline or waterway. The fiber block planting system can be made of interlocking fiber block planting segments that connect without the need for specialized tools or connecting hardware. The fiber block planting system can aid in the protection of bare soil adjacent the system from erosion. Among the natural material that can be used in forming the blocks, plugs and meshes of the fiber block planting systems, coconut or coir fiber can be used to form all of these components and provide the desired characteristics of the systems.

Figure 1:
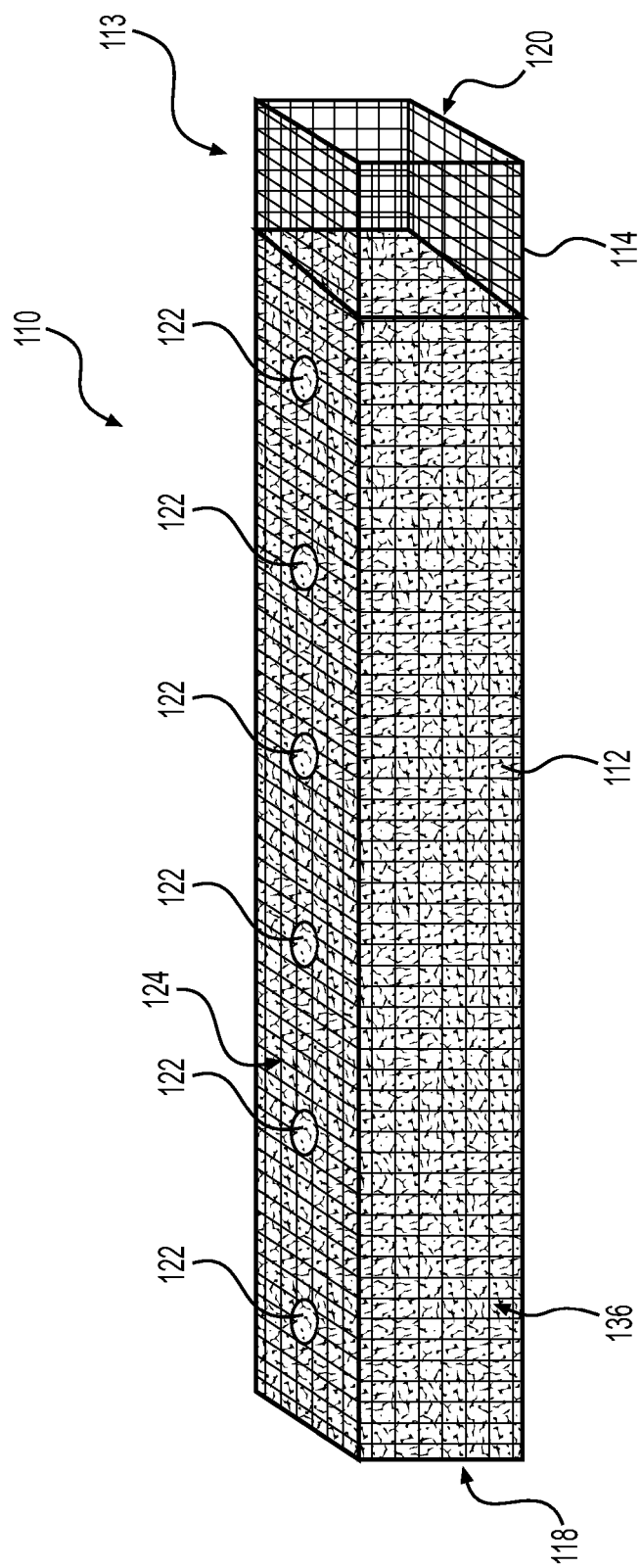
FIG. 1 is a perspective view of a fiber block planting segment encompassing aspects of the present disclosure.

FIGS. 1-5 illustrate a first embodiment of a fiber block planting segment 110 of the fiber block planting system of the present disclosure. As shown in FIG. 1, the fiber block planting segment 110 includes a compressed coir fiber block 112 encased in a sleeve 113 of a high strength coir mesh 114. The fiber block planting segment 110 includes a male end 118 and a female end 120. At the female end 120 of the fiber block planting segment 110, the coir fiber block 112 does not extend all the way to the end of the sleeve 113 of coir mesh 114. The coir mesh 114 can be made of coir fibers, other biodegradable fibers, or synthetic fibers, or the twine can be made with biodegradable fibers wrapped around a synthetic core. The coir fabric block 112 is generally rectangular in cross-section and is elongated horizontally. The coir fabric block 112 includes a top surface 124, a bottom surface opposite the top surface 124, a front surface 136 and a rear surface opposite the front surface 136. When installed along a stream bank or shoreline, the front surface 136 can be aligned facing outward toward the water, while the opposing rear surface is aligned toward the bank or shoreline.

Figure 2:
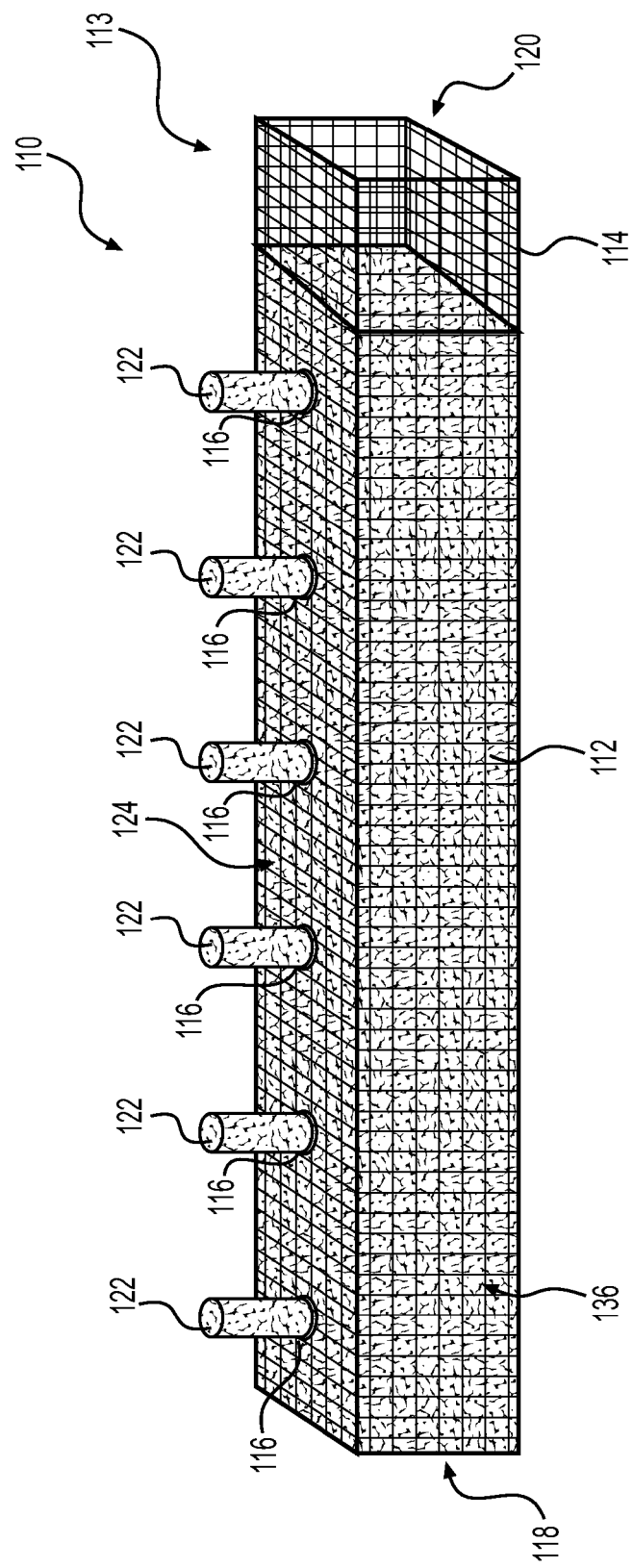
FIG. 2 is a perspective view of the fiber block planting segment of FIG. 1 with the channel plugs partially removed from the channels.

As shown in FIGS. 1 and 2, the fiber block 112 also includes a plurality of channel plugs 122 inserted into a plurality of channels formed in the block 112. As shown in FIG. 2, each channel 116 includes a channel plug 122 that is removably disposed therein. The channel plugs 122 are formed of the same coir fiber from which the coir fiber block 112 is formed. As shown in FIG. 1, the channel plugs 122 can be inserted in the coir fiber block 112 so that the top of each channel plug 122 is aligned flush with the top surface 124 of the coir fiber block 112. The channel plugs 122 can exhibit the same color as the coir fiber block 112, or, alternatively, be shaded on the tops or along the lengths thereof a different color to highlight the relative positions along the coir fiber block 112. As shown in FIGS. 1 and 2, the channel plugs 122 are generally cylindrical to match the shape of the channels 116. The present disclosure encompasses fiber block planting segments that include channels and channel plugs of various configurations in additions to cylindrical arrangements, such as rectangular or other convenient configurations.

Figure 3:
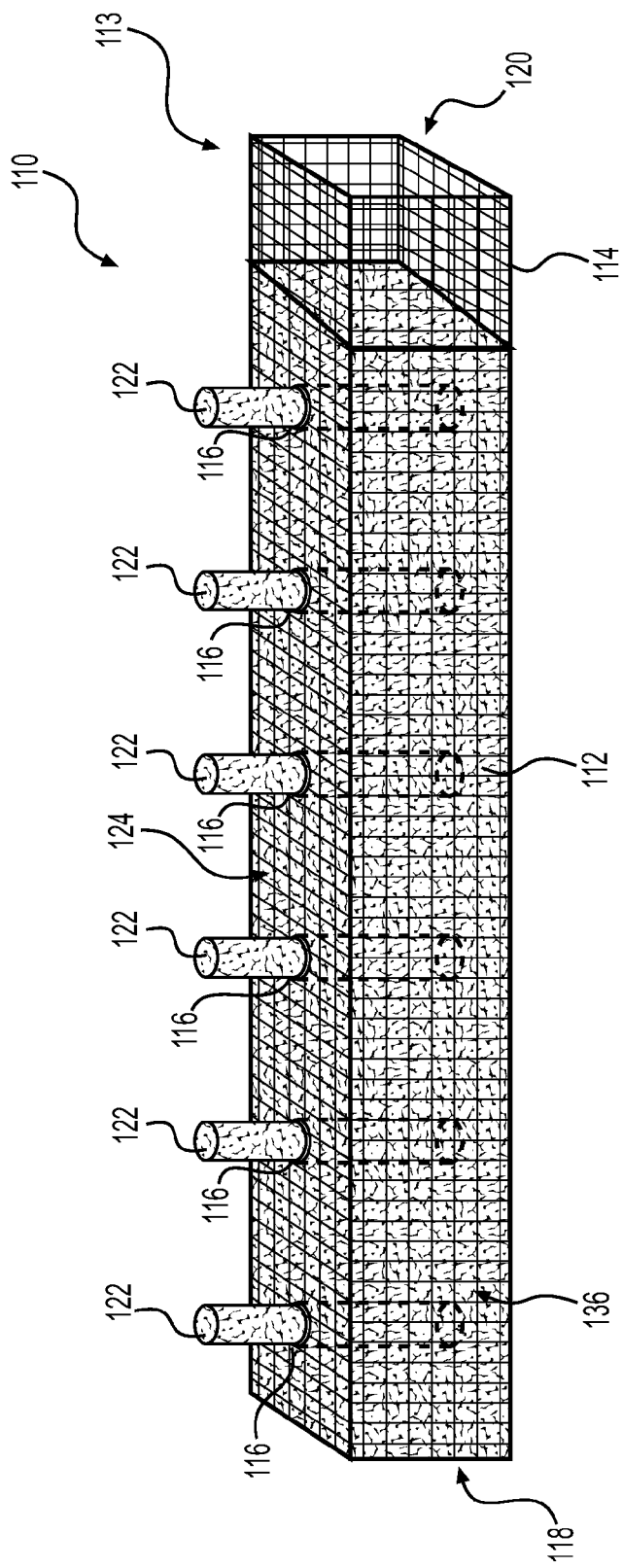
FIG. 3 is a perspective view of the fiber block planting segment shown in FIG. 1 with the channel plugs completely removed and the channels shown in phantom line.

As shown in FIG. 3, each of the plurality of channels 116 are cylindrical and extend vertically completely through the coir fiber block 112 along a mid-line thereof. Each of the plurality of channels 116 open to the top surface 124 and the bottom surface which is opposed to the top surface, thereby allowing each of the channels 116 to be open to the exterior of the coir fiber block 112 in two separate places along the block 112. The channels 116 shown in fiber block 112 are aligned parallel along the mid-line of the block 112 and equidistant to each other.

Figure 4:
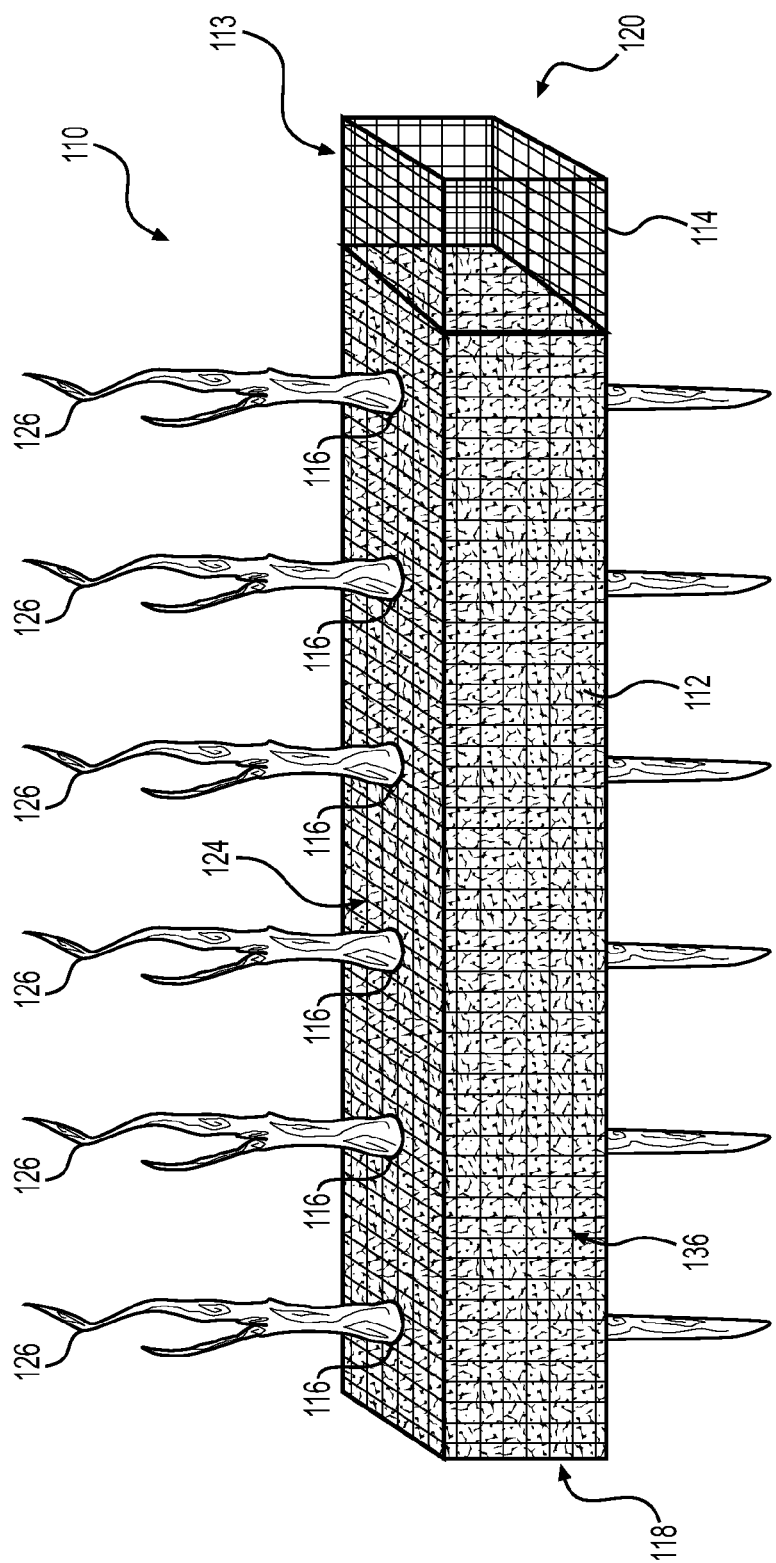
FIG. 4 is a perspective view of the fiber block planting segment shown in FIG. 1 with cuttings of live plants inserted into the channels of the fiber block.

As shown in FIG. 4, a cutting of a live plant 126 can be inserted into each of the channels 116 formed in the coir fiber block 112. Since each of the channels 116 extend all the way through the fiber block 112, each of the plants 126 can be inserted so that one end thereof protrudes from the top surface of the block 112 and the other end of the cutting protrudes from the bottom surface of the fiber block 112. In this alignment with the ends of the plants 126 extending out of the channels 116 formed in the fiber block 112, the plants 126 can be inserted sufficiently deep into the soil of a stream bank or shoreline to provide an alignment whereby the cutting can take root and grow and can extend out of the block sufficiently far enough into the atmosphere to take in the light and carbon dioxide needed for growth and development. In an alternative configuration, one or more of the channels 116 can be left without a plant 126 disposed therein when the fiber block planting segment 110 is installed in a fiber block planting system on a bank or shoreline, in which case the channel plugs 122 can be left disposed in the channels 116 that are not used to retain a plant 126 in the fiber block planting system.

Figure 5:
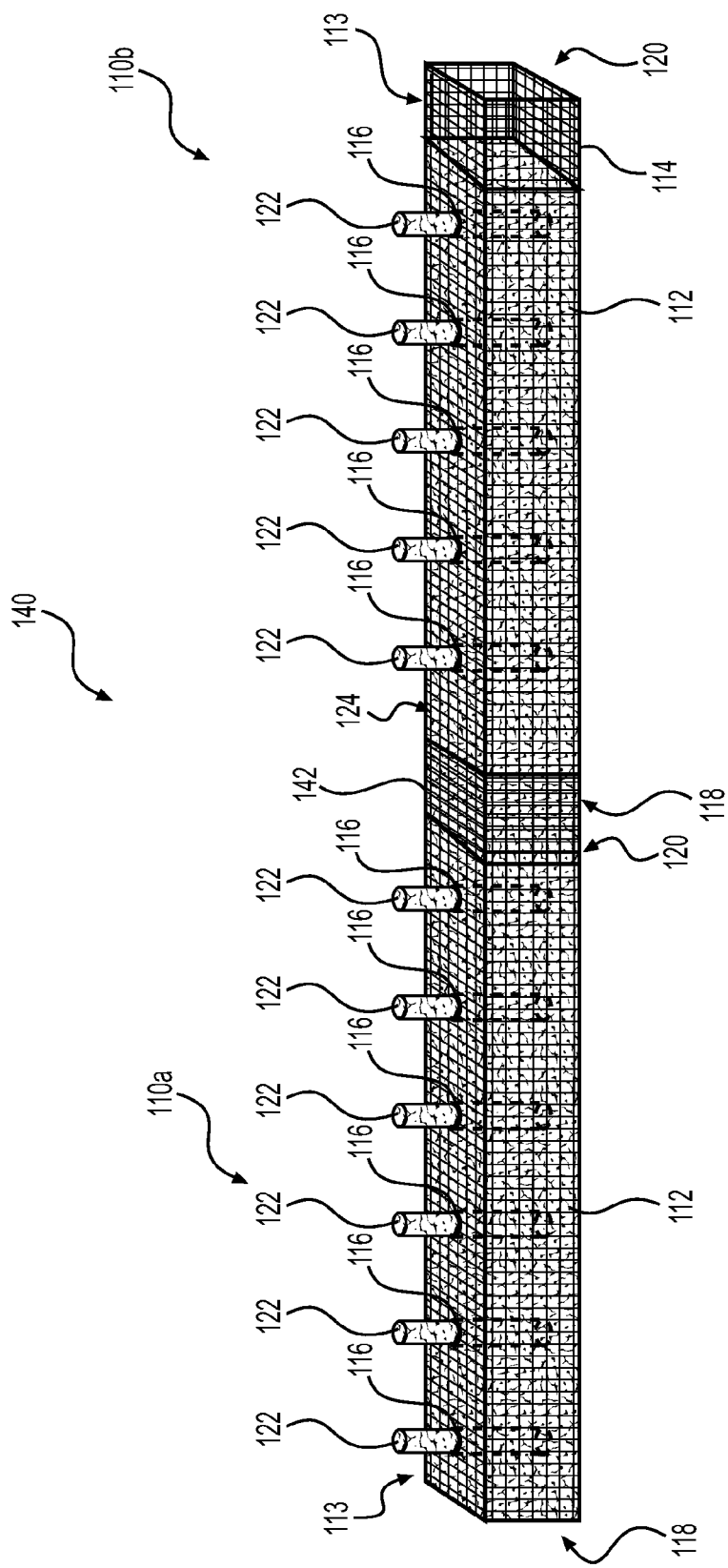
FIG. 5 is a perspective of the fiber block planting segment shown in FIG. 1 connected to another fiber block planting segment to form a fiber block planting system.

FIG. 5 shows the fiber block planting segment 110*a* joined to a second fiber block planting segment 110*b* in a fiber block planting system 140. The channel plugs 122 disposed in each of the channels 116 are shown partially removed. The female end 120 of the fiber block planting segment 110*a* on the left receives the male end 118 of the fiber block planting segment 110*b* on the right to form a joint 142. The sleeve 113 of the fiber block planting segment 110 is pulled over the end of the fiber block 112 of the second fiber block planting segment 110*b*. In this manner, two or more fiber block planting system segments can be joined together in a fiber block planting system 140 that is installed along a stream or river bank or a lake or ocean shoreline.

Figure 6:
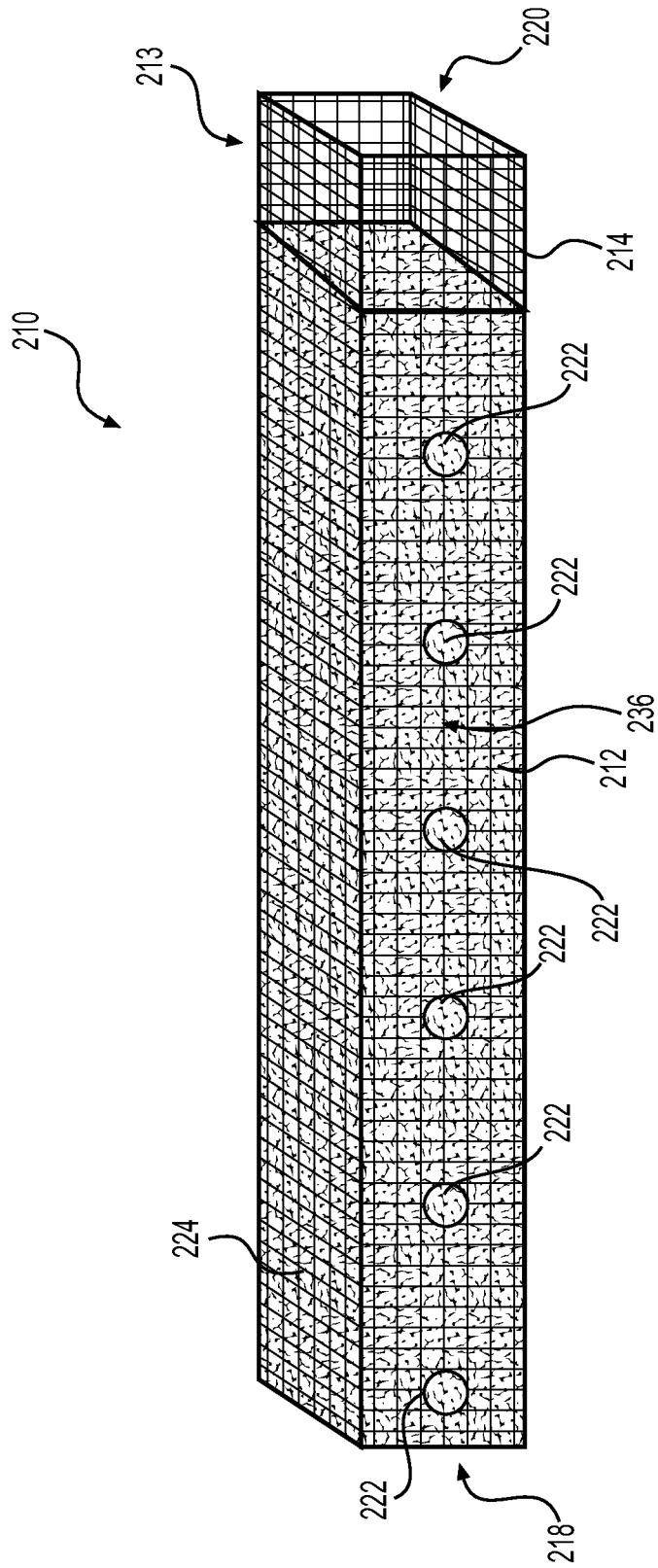
FIG. 6 is a perspective view of another fiber block planting segment encompassing aspects of the present disclosure.
Figure 7:
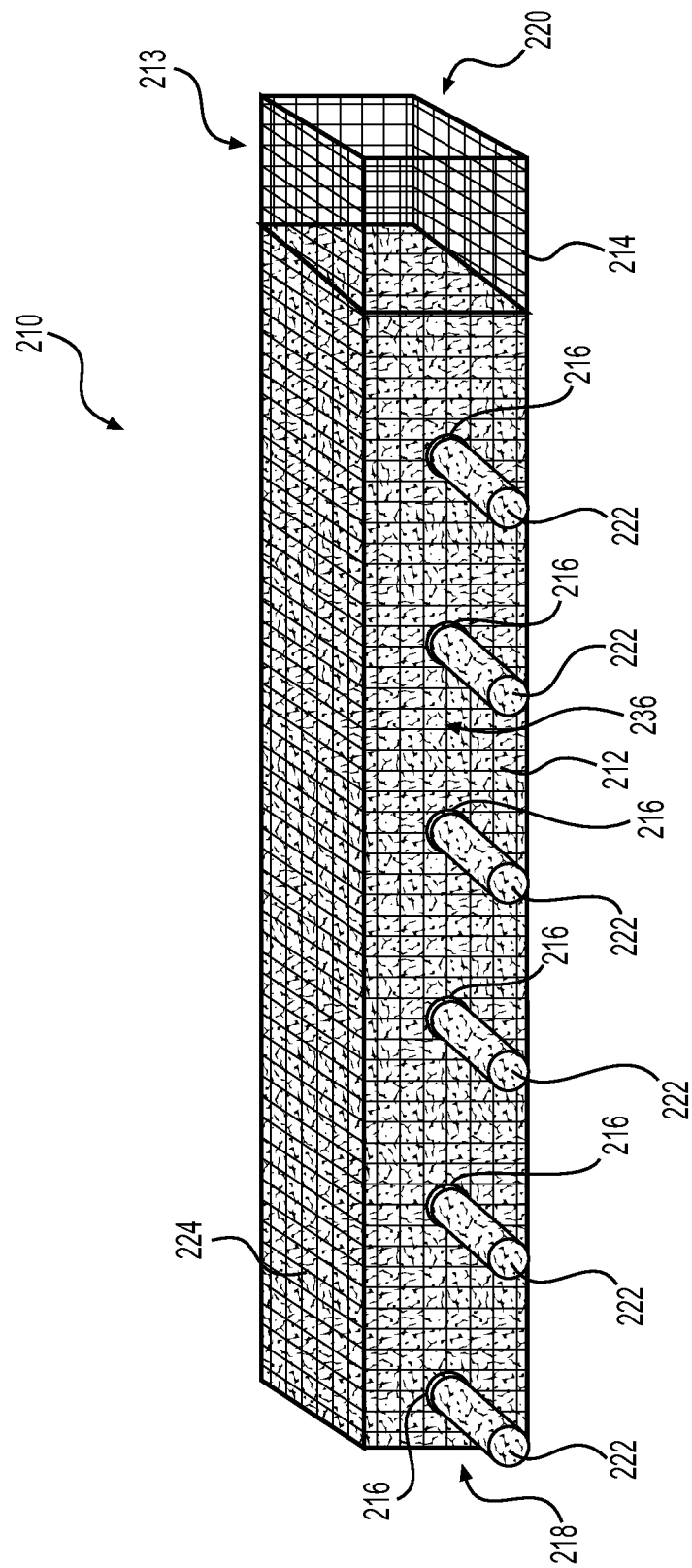
FIG. 7 is a perspective view of the fiber block planting segment of FIG. 6 with the channel plugs partially removed from the channels formed in the fiber block.
Figure 8:
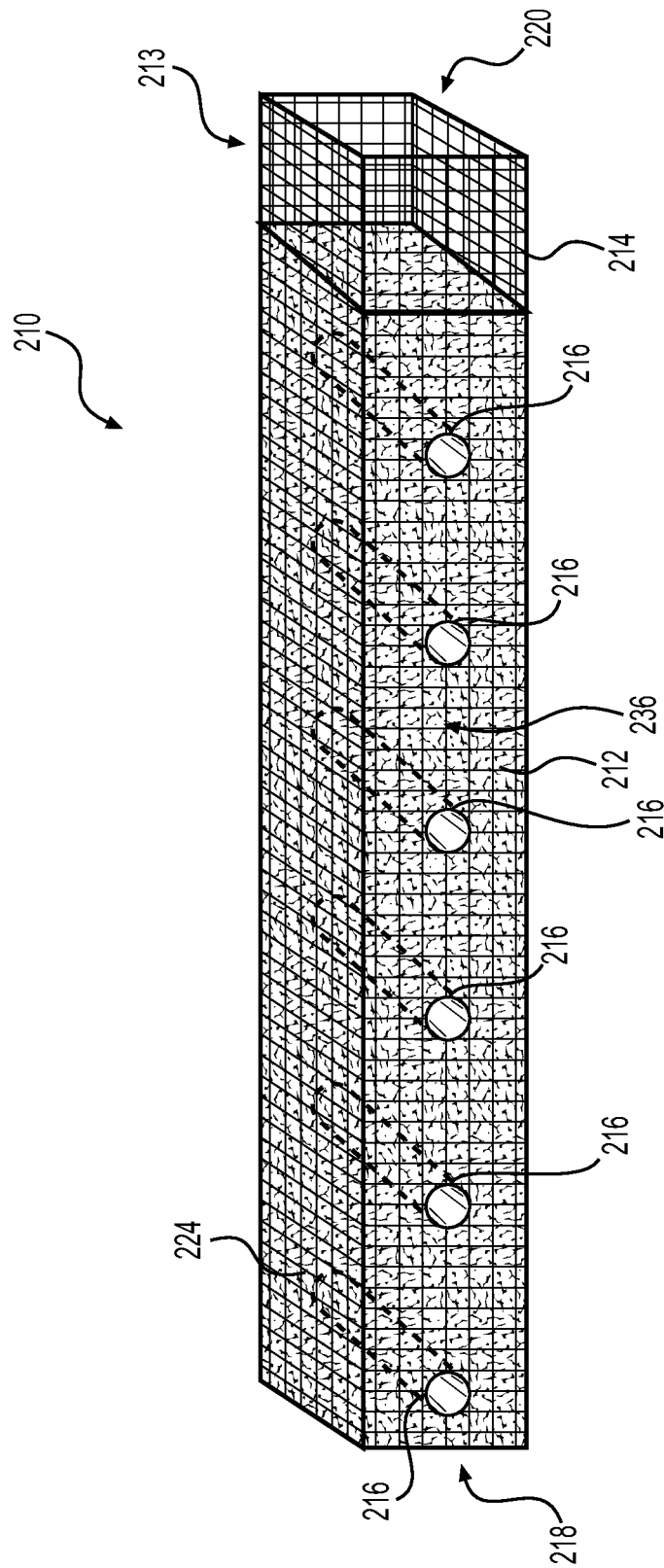
FIG. 8 is a perspective view of the fiber block planting segment shown in FIG. 6 with the channel plugs completely removed and the channels shown in phantom line.
Figure 9:
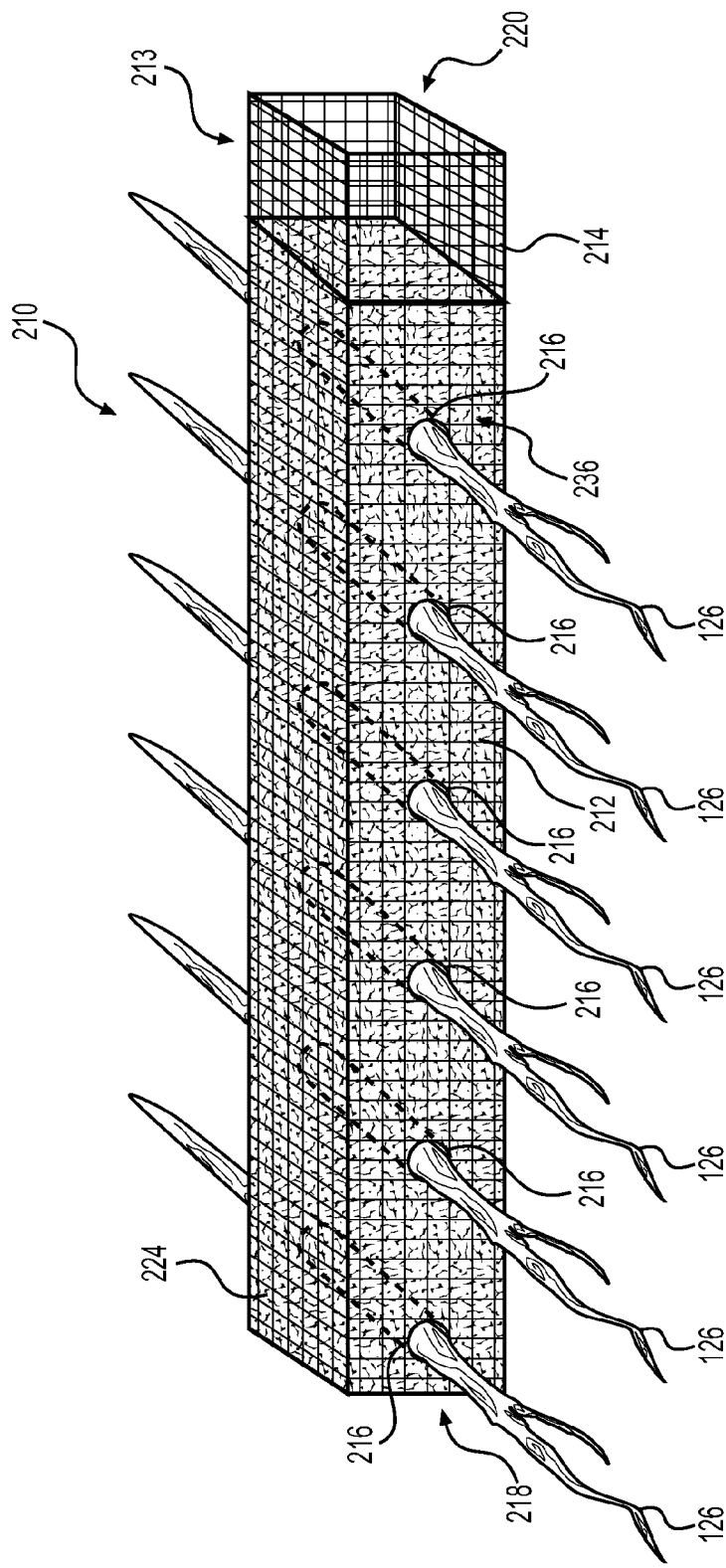
FIG. 9 is a perspective view of the fiber block planting segment shown in FIG. 6 with cuttings of live plants inserted into the channels.

FIGS. 6-9 illustrate another embodiment of a fiber block planting segment 210 in which a plurality of channels 216 are aligned horizontally in the fiber block 212. As shown in FIG. 6, a channel plug 222 is disposed in each of the plurality of channels. The head of each channel plug 222 is aligned flush with the front surface 236 of the fiber block 212. The fiber block planting segment 210 includes the fiber block 212 in which the channel plugs 222 are horizontally disposed. Encasing the fiber block 212 is a sleeve 213 of coir mesh 214. The fiber block 212 and the sleeve 213 combine to form a male end 218 and a female end 220 of the fiber block planting segment 210. As shown in FIG. 7, the channel plugs 222, formed of the same coir fiber as the fiber block 212, are shaped as cylinders to fit snugly in the horizontal cylindrical channels 216. As shown in FIG. 8, the horizontally aligned channels 216 are positioned along a mid-line of the fiber block 212 and extend completely through the fiber block 212 from the front surface 236 to the rear face so that each channel 216 opens to the exterior of the fiber block 212 in two separate locations, at the front surface 236 and the rear face. The channels 216 are aligned generally parallel to the top surface 224 of the fiber block 212. As shown in FIG. 9, a cutting of a live plant 126 can be inserted into one or more of the channels 216 with a first portion of each plant 126 extending horizontally from one face of the fiber block 212 and a second portion of each cutting extending horizontally from an opposed face of the fiber block 212. In this configuration, the fiber block planting segment 210 can be used in a fiber block planting system installed on a stream bank or shoreline to plant a cutting horizontally into the bank or shoreline. Alternatively, the fiber block planting segment 210 can be installed at a sloping angle whereby the root forming end of any cutting disposed in the channels 216 are planted angled sloping downward into the bank or shoreline on which the fiber block planting segments 210 is installed.

Figure 10:
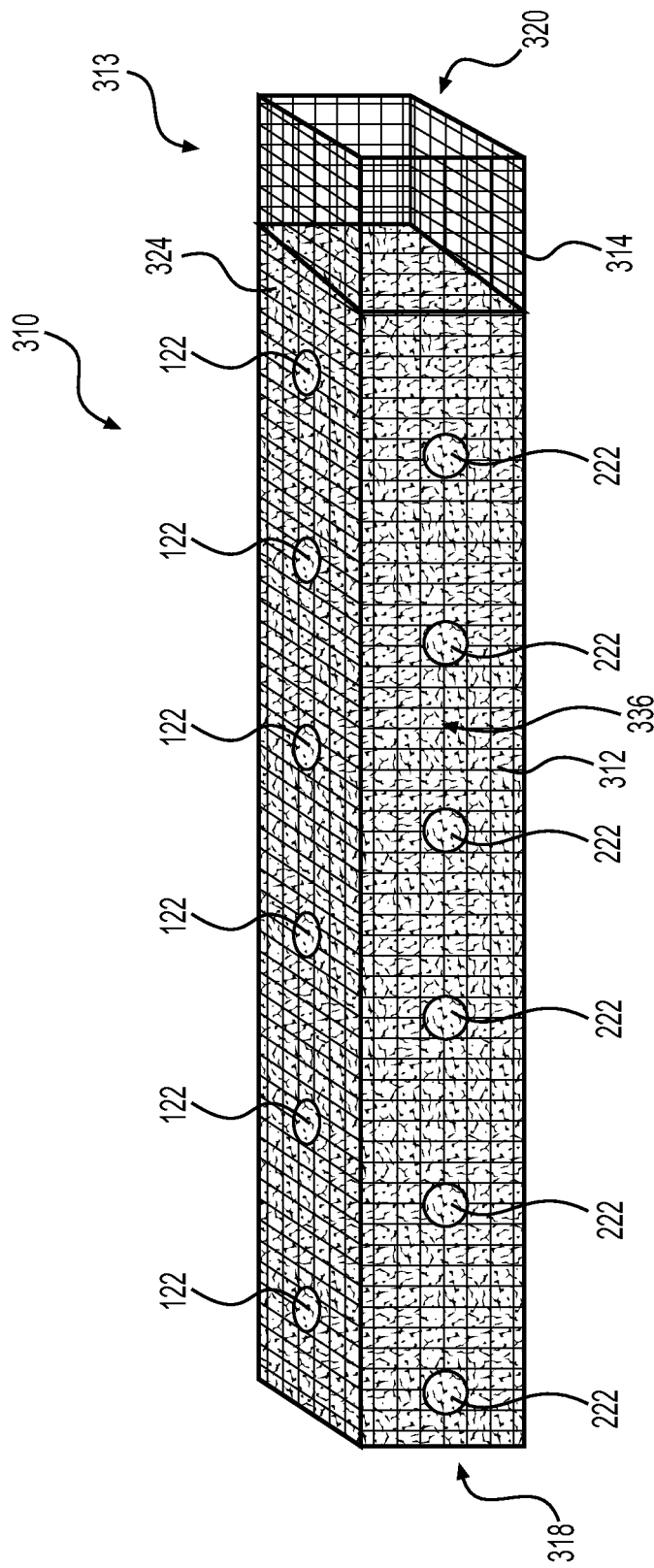
FIG. 10 is a perspective view of yet another fiber block planting segment encompassing aspects of the present disclosure.
Figure 11:
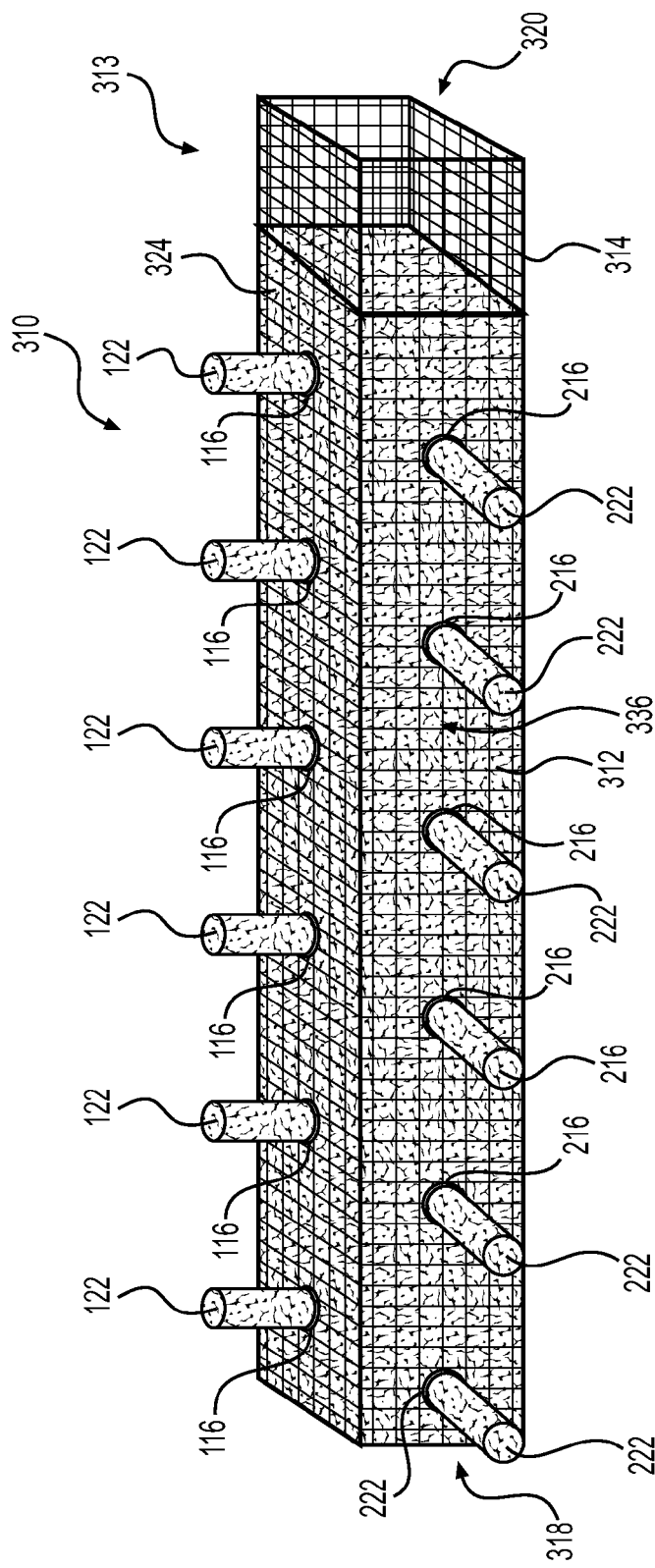
FIG. 11 is a perspective view of the fiber block planting segment of FIG. 10 with the channel plugs partially removed from the channels.
Figure 12:
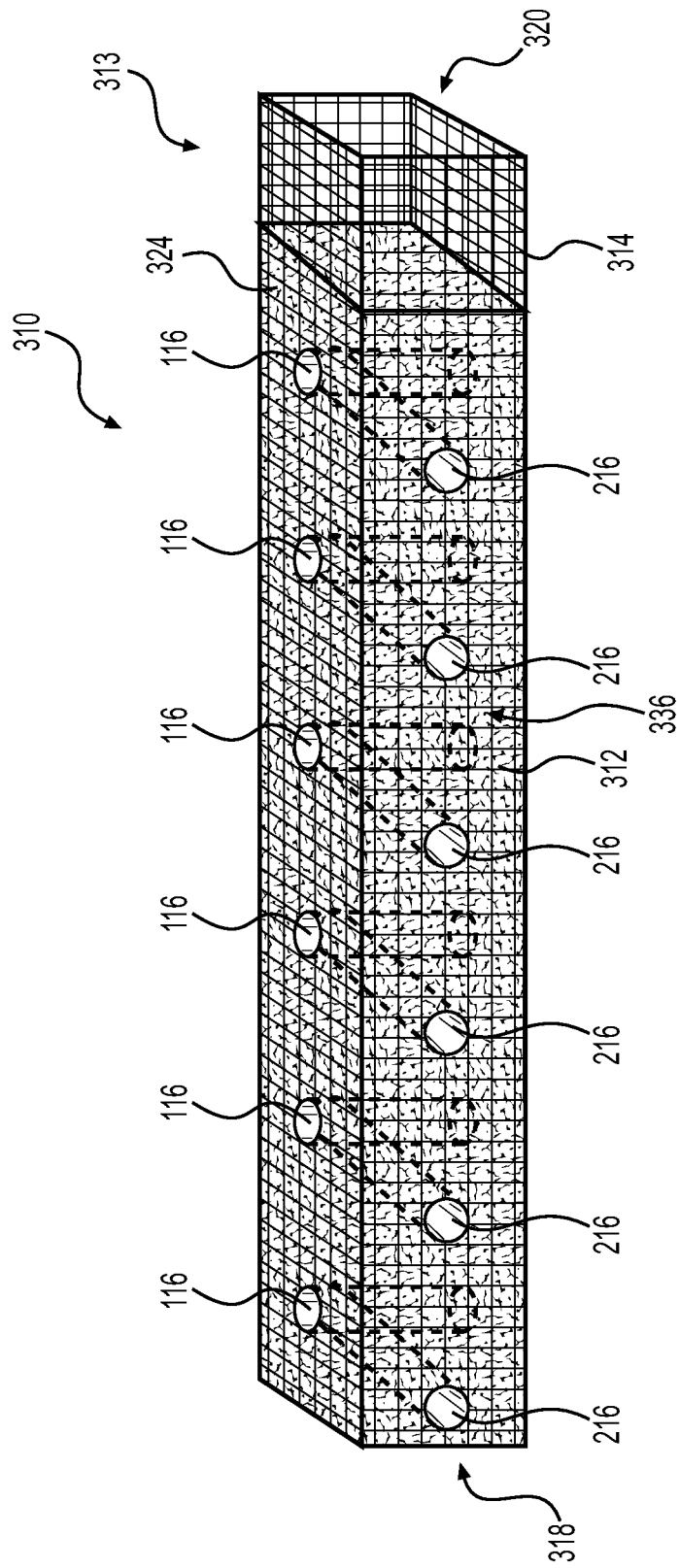
FIG. 12 is a perspective view of the fiber block planting segment shown in FIG. 10 with the channel plugs completely removed and the channels shown partially in phantom line.
Figure 13:
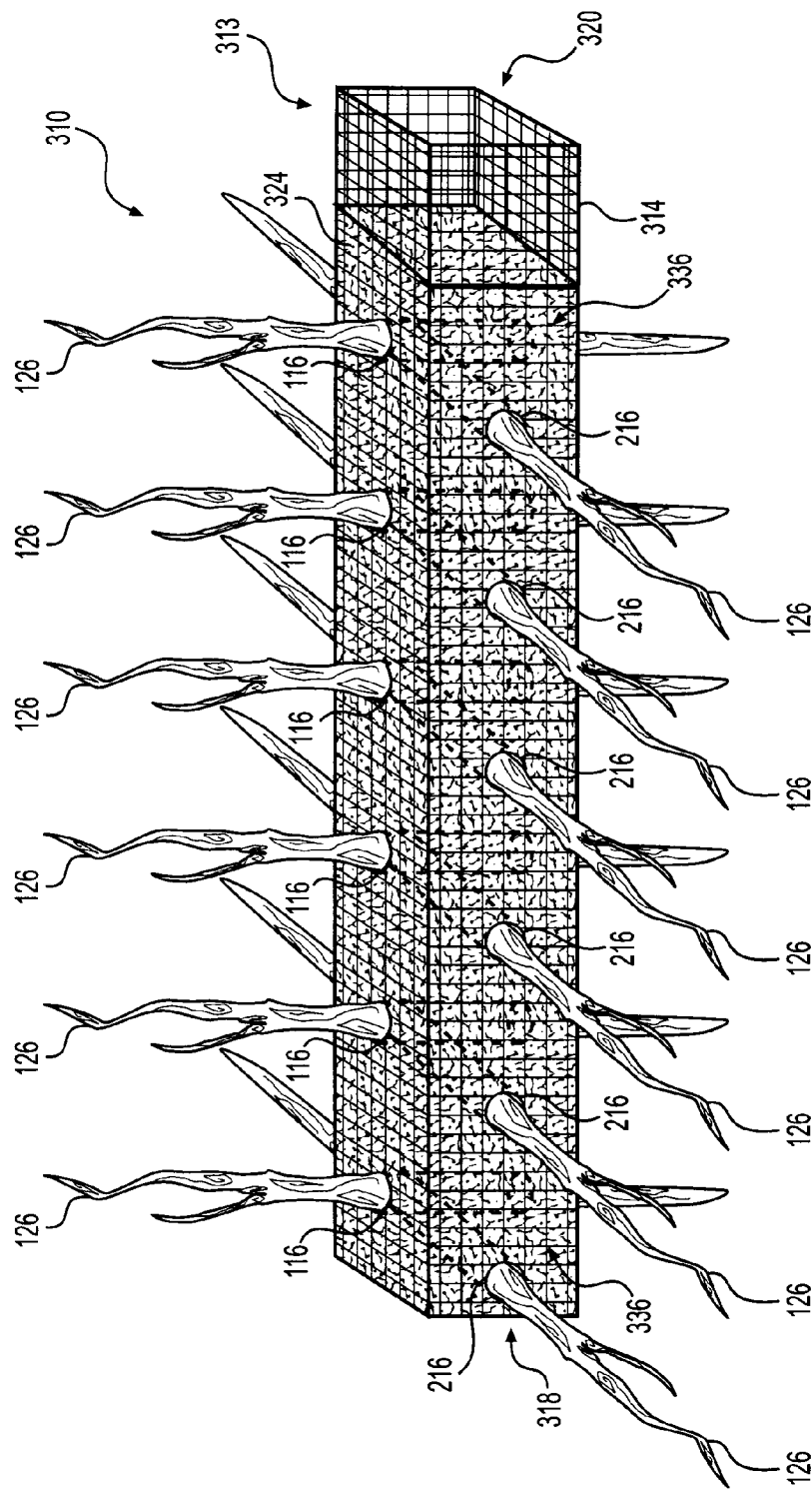
FIG. 13 is a perspective view of the fiber block planting segment shown in FIG. 10 with cuttings of live plants inserted into the channels.

FIGS. 10-13 illustrate yet another embodiment of a fiber block planting segment 310 that includes both vertically and horizontally aligned channels with channel plugs removably disposed therein. The fiber block planting segment 310 includes a fiber block 312 encased in a sleeve 313 of coir mesh 314, and has both a male end 318 and female end 320 whereby two or more fiber block planting segments 310 can be joined end to end by inserting the male end 318 of one block segment 310 into the female end 320 of an adjacent block segment 310. As shown in FIG. 10, the tops of a plurality of channel plugs 122 that are disposed in vertically aligned channels 116 are disposed flush with the top surface of the 324 of the fiber block 312, and the tops of a plurality of channel plugs 222 that are disposed in horizontally aligned channels 216 are disposed flush with the front surface 336 of the fiber block 312. As shown in FIG. 11, each of the channel plugs 122 and 222 is removably disposed in the channels 116 and 216, respectively, and is cylindrical and sized to fill the channels 116 and 216, respectively. As shown in FIG. 12, the vertical channels 116 are alternately aligned with the horizontal channels 216 formed in the fiber block 312. Each of the vertical channels 116 are aligned parallel to the other vertical channels 116 and perpendicular to each of the horizontal channels 216. Each of the channels 116 and 216 are disposed equidistant to its adjacent channels.

Figure 14:
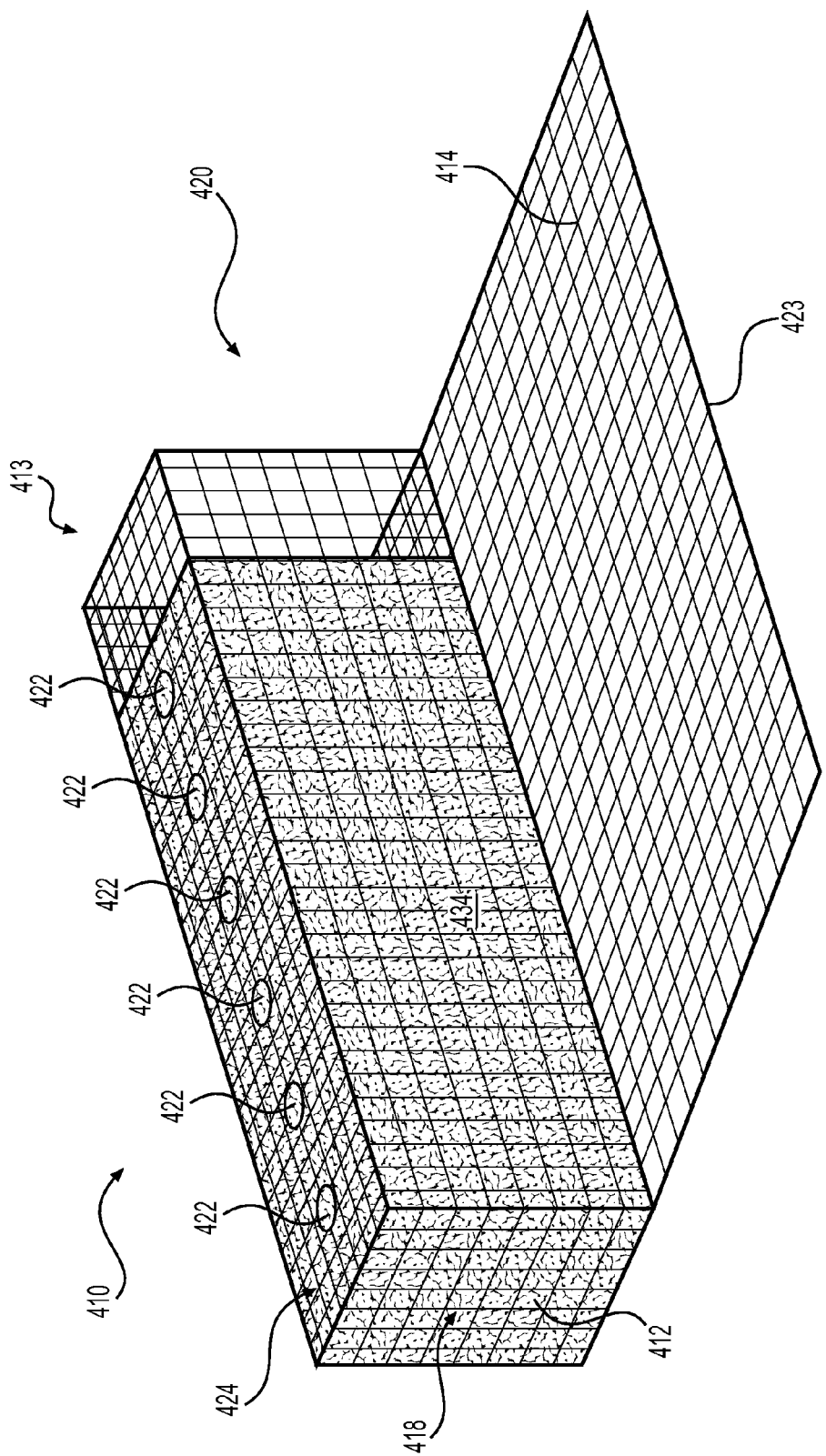
FIG. 14 is a perspective view of still a further fiber block planting segment encompassing aspects of the present disclosure.

FIGS. 14-17 illustrate yet another fiber block planting segment 410 encompassing aspects of the present disclosure. As shown in FIG. 14, the fiber block planting segment 410 includes a fiber block 412 made of coir fiber encased in a sleeve 413 of coir mesh 414. The fiber block planting segment 410 includes a male end 418 and a female end 420 that can be used to joining one fiber block segment 410 to another fiber block segment in a fiber block planting system. From the bottom of the sleeve 413 extends, perpendicular from the rear surface 434 of the fiber block 412, a bottom anchor flap 423 formed of the same coir mesh 214 as the sleeve 413. When the fiber block planting segment 410 is installed in a fiber block planting system along a bank or shoreline, the bottom anchor flap 423 can be used to secure the fiber block planting segment 410 in place by inserting one or more stakes there through and/or at least partially covering the bottom anchor flap 423 with dirt or other heavy material to prevent the bottom anchor flap 423 from moving out of position once installed.

Figure 15:
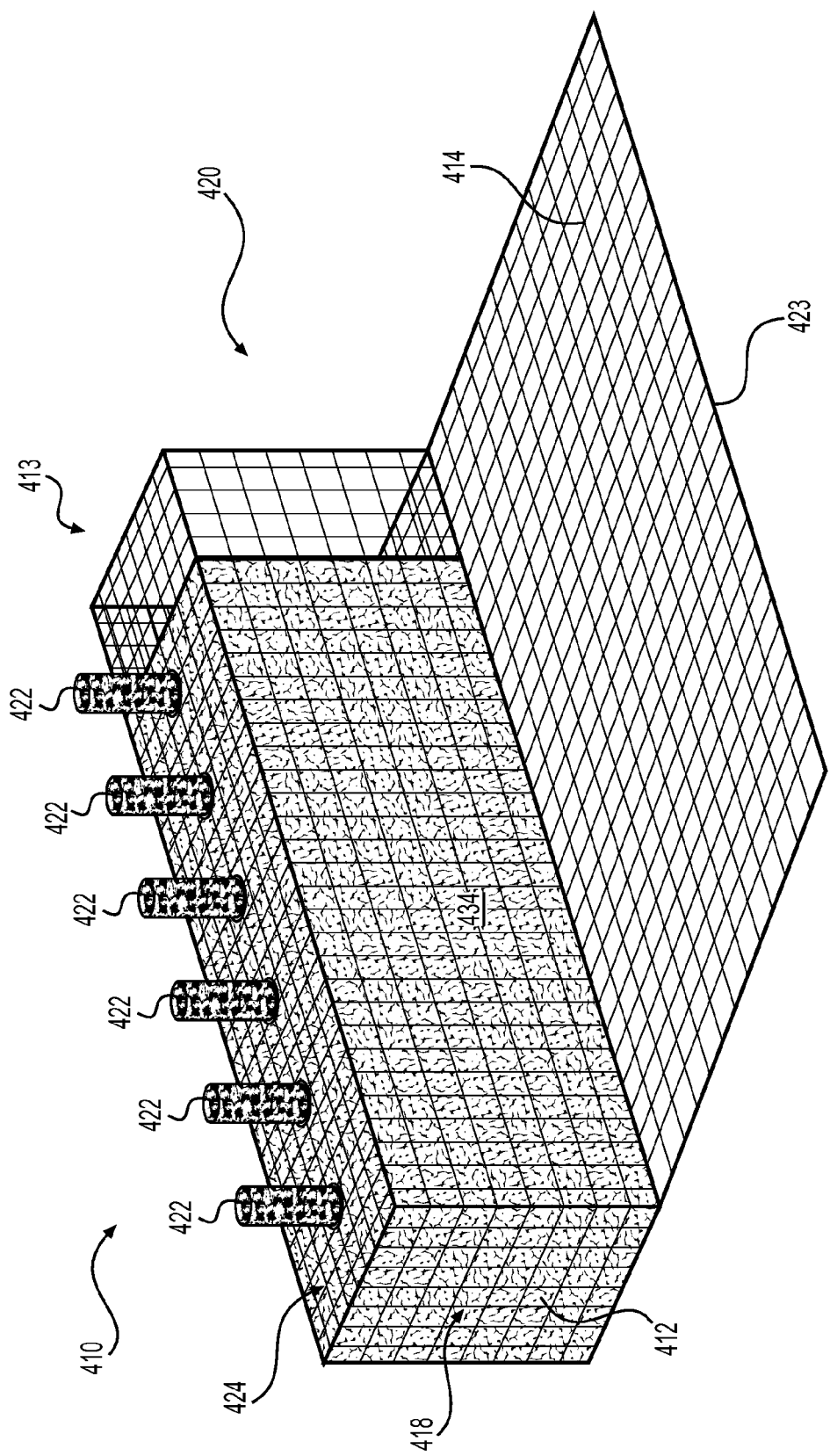
FIG. 15 is a perspective view of the fiber block planting segment of FIG. 14 with the channel plugs partially removed from the channels.
Figure 16:
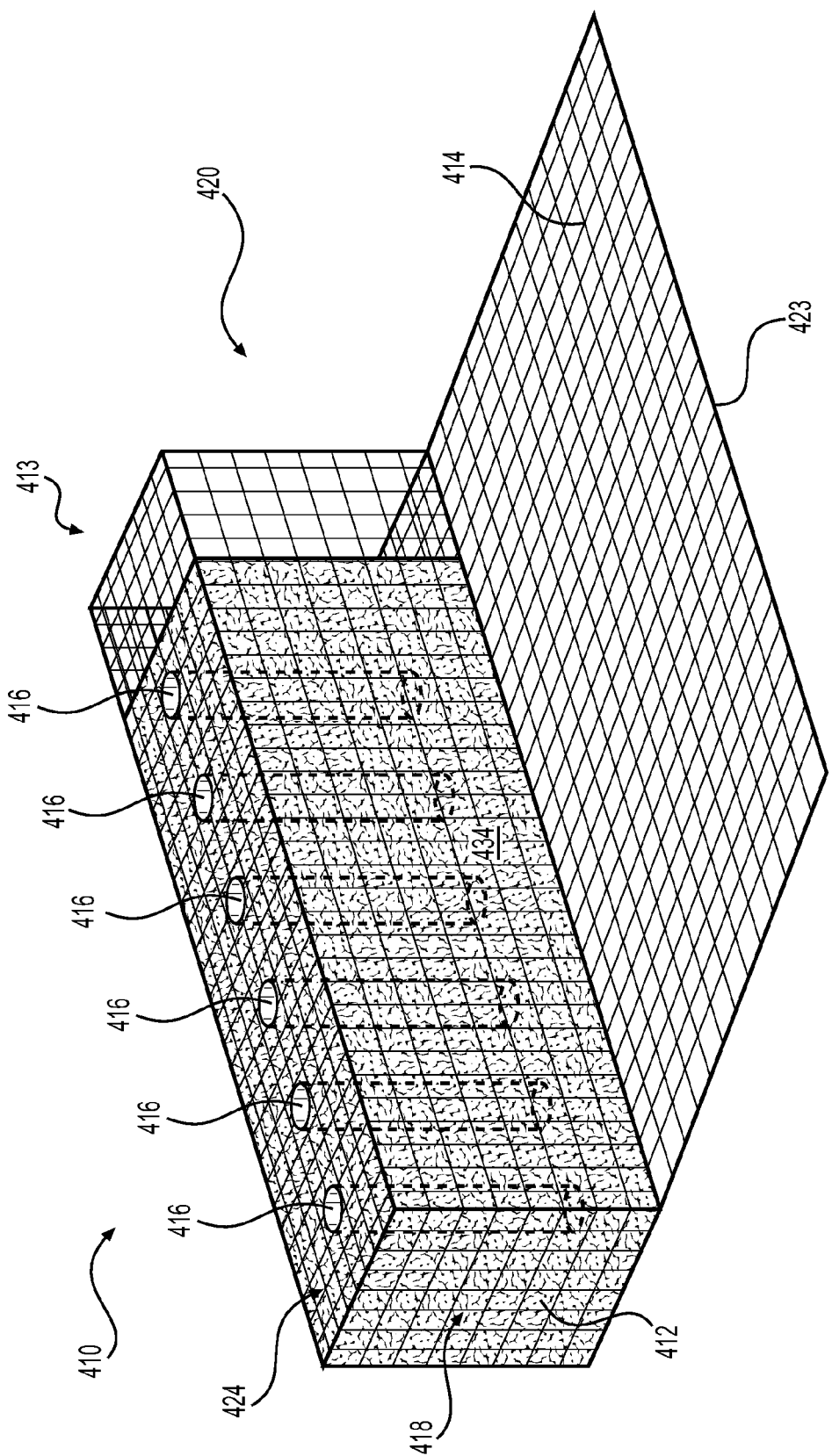
FIG. 16 is a perspective view of the fiber block planting segment shown in FIG. 14 with the channel plugs completely removed and the channels shown in phantom line.
Figure 17:
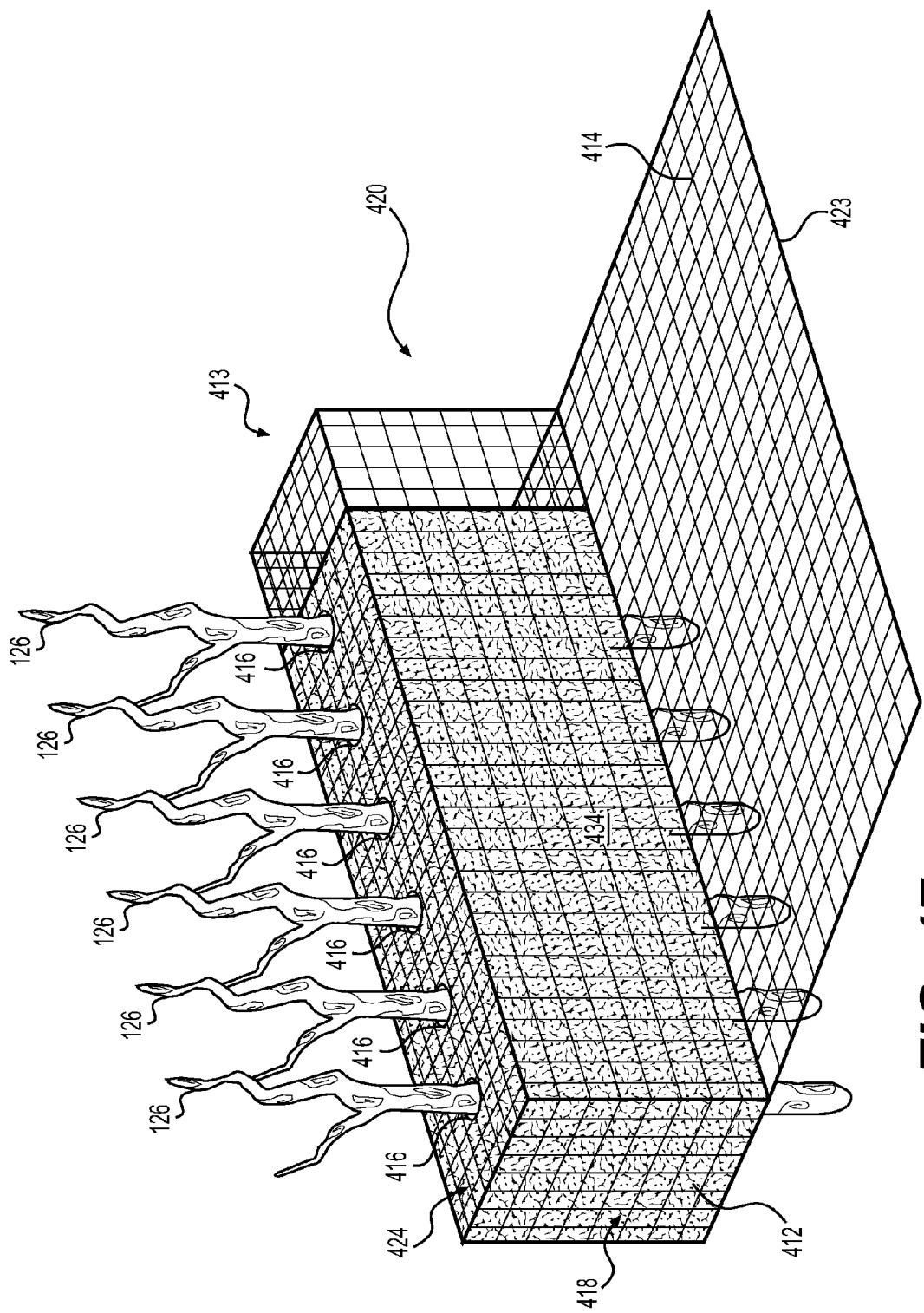
FIG. 17 is a perspective view of the fiber block planting segment shown in FIG. 14 with cuttings of live plants inserted into the channels.

As shown in FIG. 14, the fiber block 412 includes a plurality of channel plugs 422 the tops of which are disposed flush with the top surface 424 of the fiber block 412. Each channel plug 422 is disposed within a channel 416, as shown in FIGS. 15 and 16. Each channel plug 422 is cylindrical and sized to fit securely in the respective channel 416. The channels 416 are spaced apart and disposed along a mid-line of the fiber block 412. Each of the channels 416 is cylindrical and extend completely through the fiber block 412 and are aligned perpendicular to the top surface 424 of the fiber block and the bottom surface thereof. Each channel 416 is open to the exterior of the fiber block at both the top surface 424 and the bottom surface. As shown in FIG. 17, a cutting of a live plant 126 can be inserted into channels 416 with a top portion of the plant 126 extending out of the top surface 424 of the fiber block 412 and a bottom portion of the plant 126 extending out of the bottom surface of the fiber block 412. In this arrangement, the cuttings of live plants 126 can be planted along a bank or shoreline on which the fiber block planting segment 410 is installed. The fiber block planting segment 410 anchors the cuttings in place on the bank or shoreline, thereby allowing time for the cuttings to take root in the soil.

Figure 18:
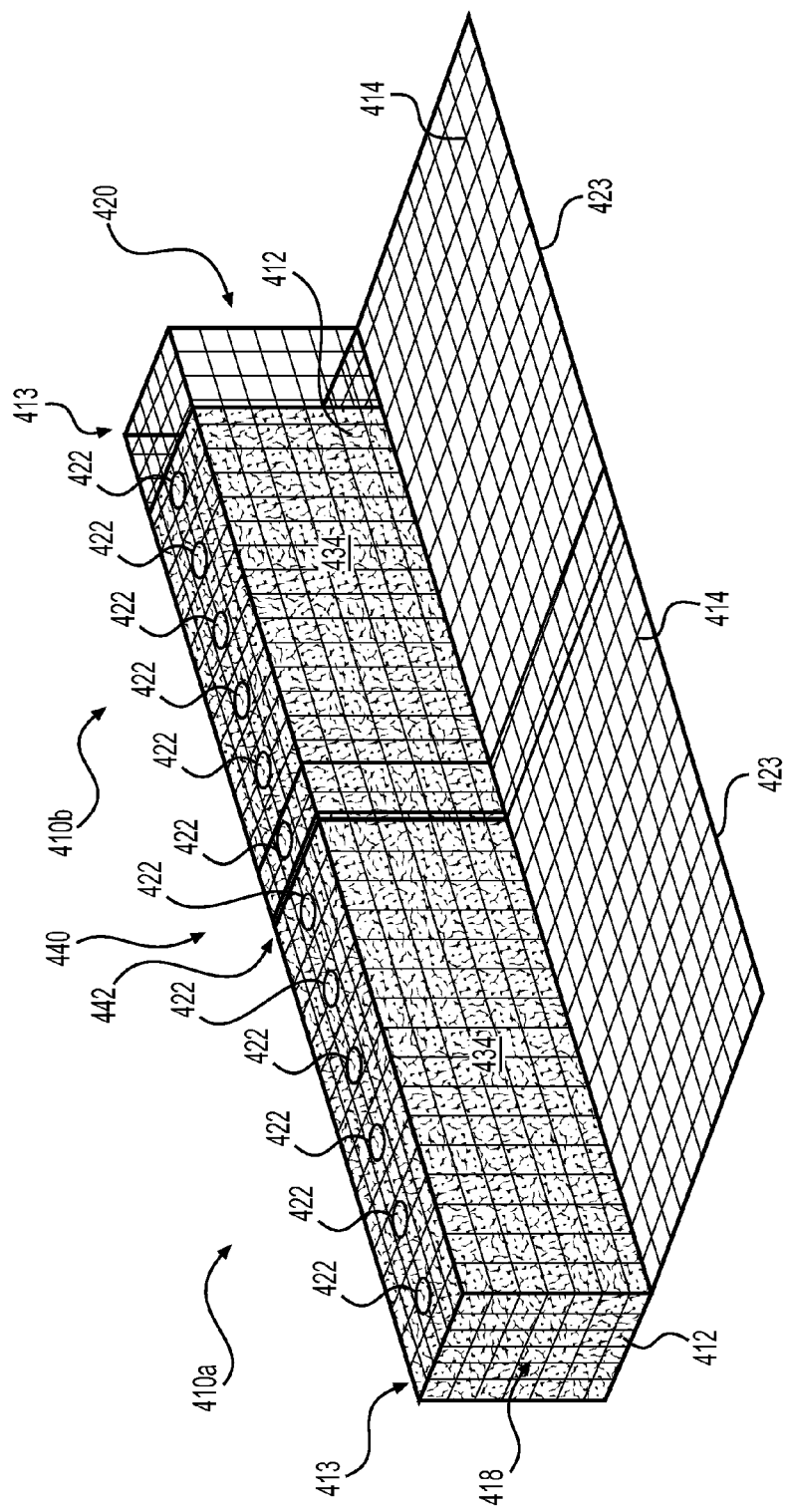
FIG. 18 is a perspective view of the fiber block planting segment shown in FIG. 14 connected to another fiber block planting segment in a fiber block planting system.
Figure 19:
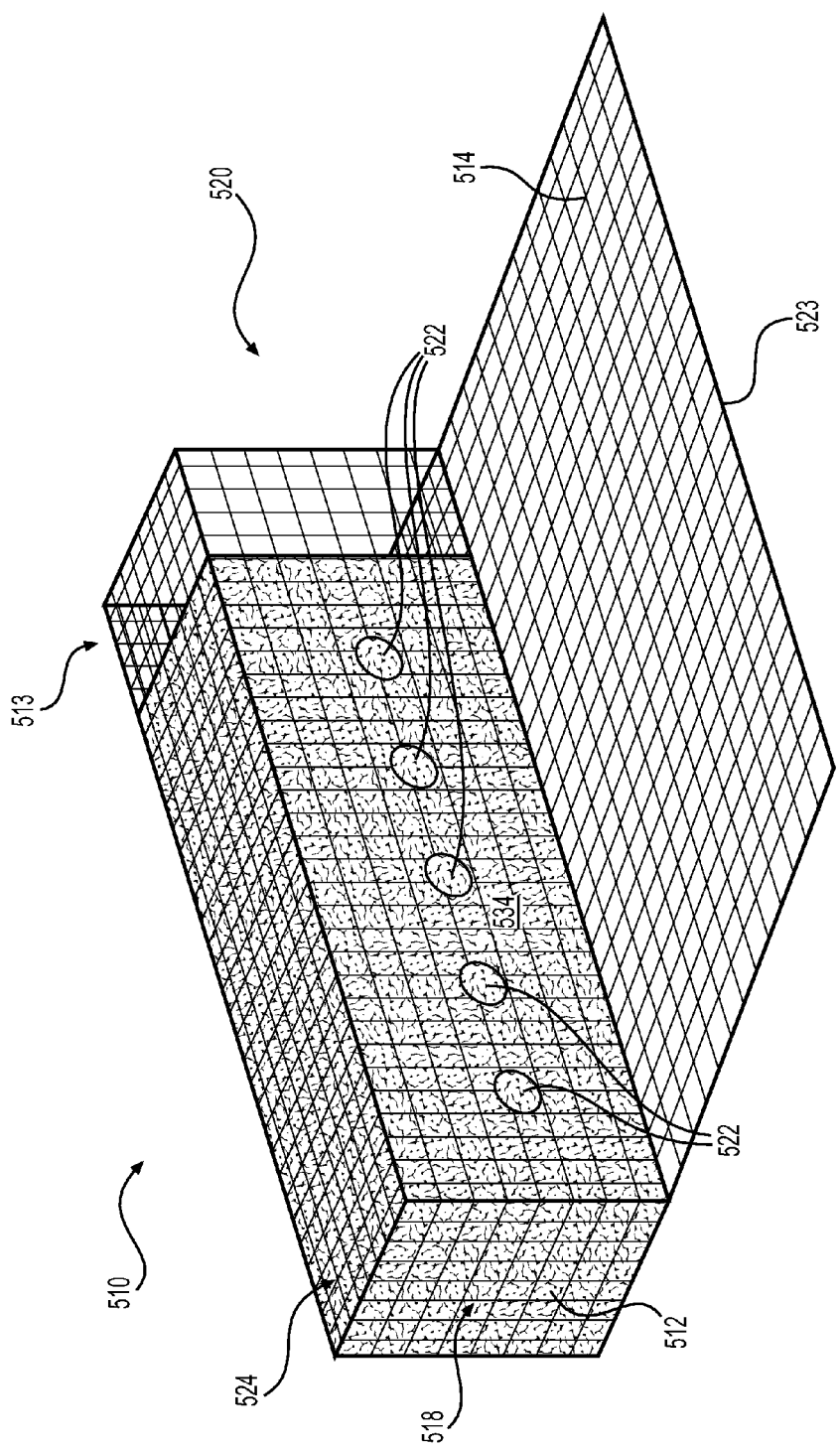
FIG. 19 is a perspective view of still another fiber block planting segment encompassing aspects of the present disclosure.
Figure 20:
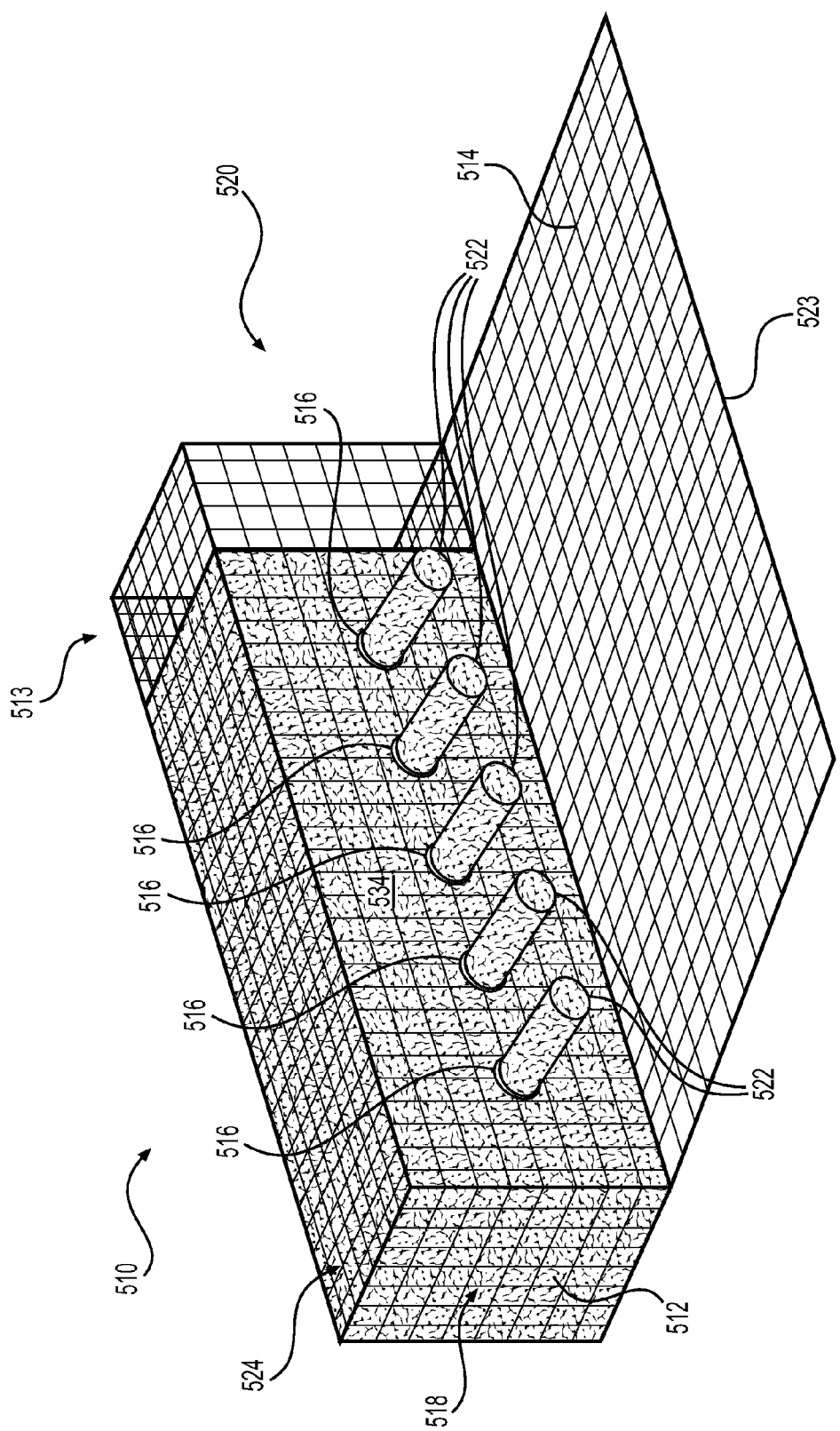
FIG. 20 is a perspective view of the fiber block planting segment of FIG. 19 with the channel plugs partially removed from the channels.
Figure 21:
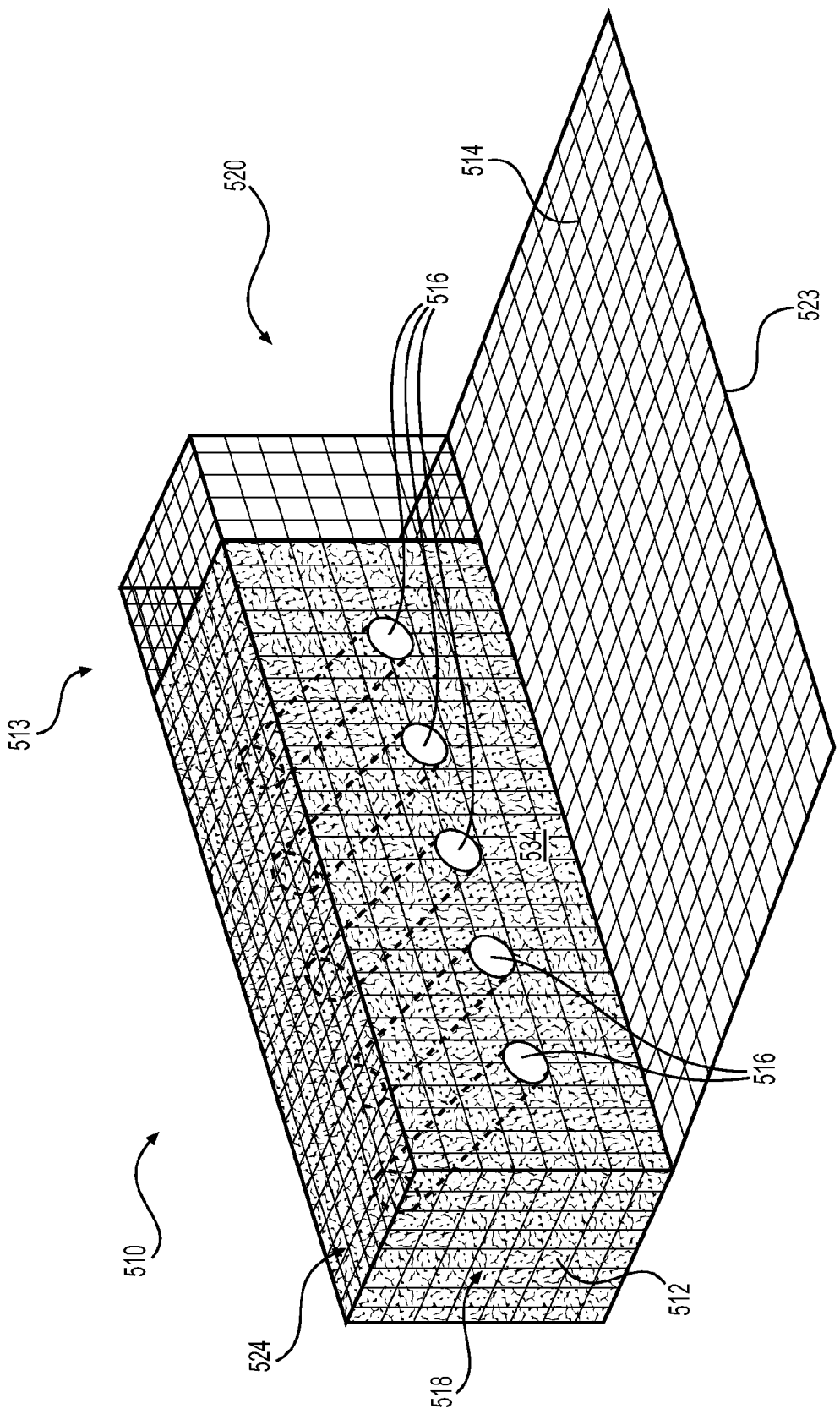
FIG. 21 is a perspective view of the fiber block planting segment shown in FIG. 19 with the channel plugs completely removed and the channels shown in phantom line.

FIG. 18 illustrates a fiber block planting segment 410*a* joined to an adjacent fiber block planting segment 410*b* in a fiber block planting system 440. The male end of the fiber block planting segment 410*b* is inserted into the female end of the adjacent fiber block planting segment 410*a*, thereby forming a joint and joining the two fiber block planting segments 410*a* and 410*b* together. The bottom anchor flaps 423 of each fiber block planting segment 410*a* and 410*b* overlap and form a continuous layer that can be used to secure the fiber block planting system 440 in place on a stream bank or shoreline.

Figure 22:
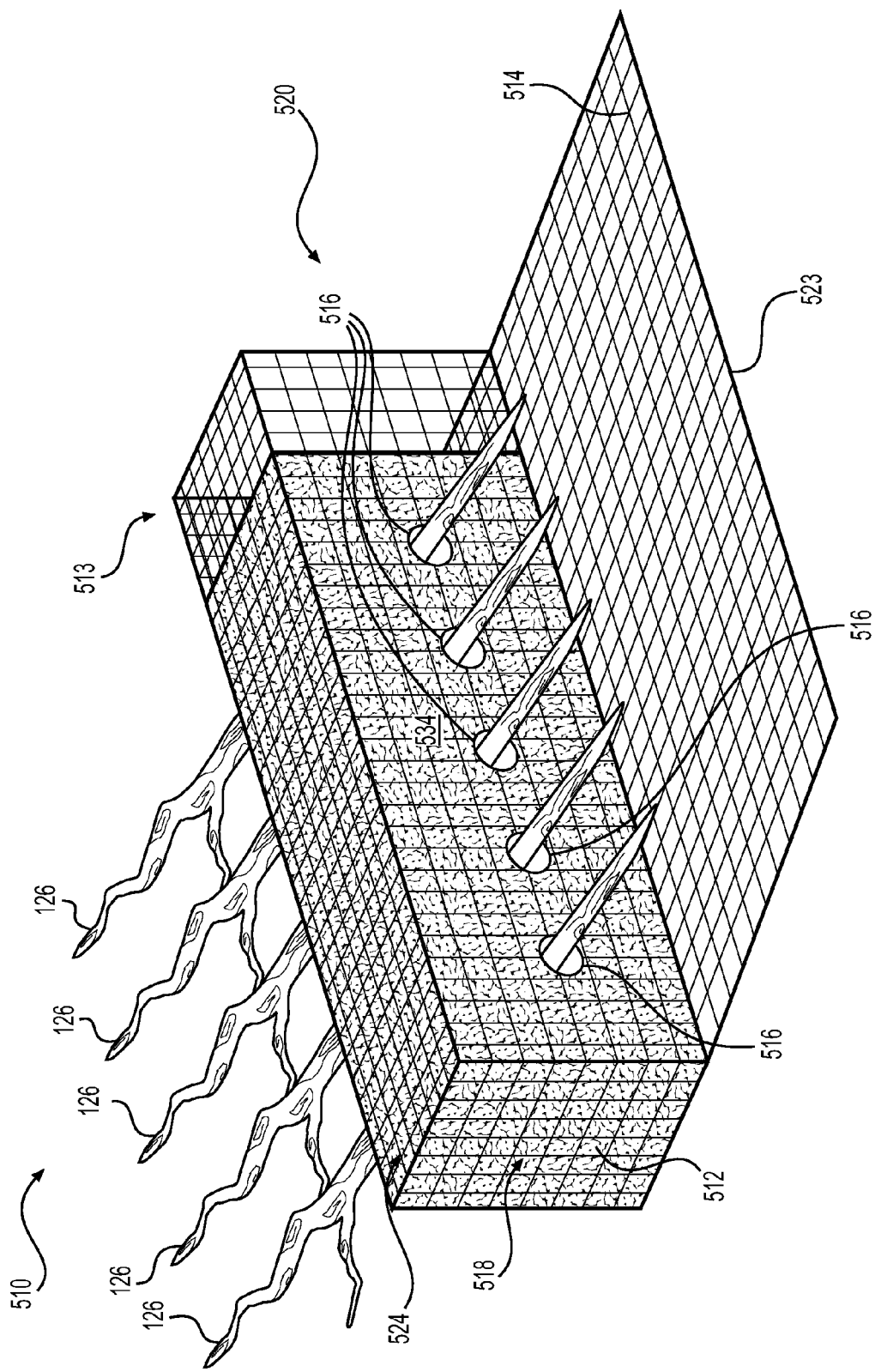
FIG. 22 is a perspective view of the fiber block planting segment shown in FIG. 19 with cuttings of live plants inserted into the channels.

FIGS. 19-22 illustrate still another fiber block planting segment 510 encompassed by the present disclosure. The fiber block planting segment 510 includes a rectangular fiber block 512 formed of coir fiber and encased in a sleeve 513 formed of coir mesh 514. The fiber block planting segment 510 includes a male end 518 and an female end 520 that can be used to join more than one fiber block planting segment 510 together to form a fiber block planting system. A bottom anchor flap 523 extending from the sleeve 513 is provided to anchor the fiber block planting segment 510 in place when installed. The fiber block 512 includes a plurality of channels 516 extending through the fiber block 512. Each of the channels 516 are cylindrical and open to the rear face 534 and the front surface of the fiber block 512. The channels 516 are angled oblique to the rear face 534 and the front surface of the fiber block 512. In each channel 516 is a removably disposed channel plug 522 made of coir fiber and cylindrically formed. As shown in FIG. 22, a cutting of a live plant 126 can be inserted into each of the channels 516 at angle oblique to the top surface 524 of the fiber block 512. The end of each cutting that is to be planted in the soil along a bank or shore line extends from the rear face 534 of the fiber block 512.

FIGS. 23-26 illustrate a further embodiment of a fiber block planting segment 610 that encompasses aspect of the present disclosure. The fiber block planting segment 610 includes a fiber block 612 formed of coir fabric, a sleeve 613 formed of coir mesh 614 encasing the fiber block 612, and a bottom anchor flap 623 formed of coir mesh 614 extending from the bottom of the sleeve 613. The fiber block planting segment 610 includes a male end 618 and a female end 620 formed by the sleeve 613 that cooperate between segments so as to be able to join adjacent fiber block planting segments 610 in a fiber block planting system. The fiber block 612 includes a first plurality of channels 416 extending vertically there through and a second plurality of channels 516 extending at there through at an angle oblique to the top surface 624 of the fiber block 612. Each of the channels 416 and 516 extend completely through the fiber block 612 and are open to the exterior of the block at both ends of each channel. The vertically aligned channels 416 are open to both the top surface 624 and the bottom surface of the fiber block 612. The channels 516 are open to both the rear surface 634 and the opposing front surface of the fiber block 612. Along the length of the fiber block 612, the channels 416 and 516 are alternatively disposed such that the vertically aligned channels 416 are disposed adjacent at least one obliquely aligned channel 516. Each of the channels 416 and 516 are space equally from the adjacent channels. The vertically aligned channels 416 are aligned obliquely to the channels 516.

Figure 23:
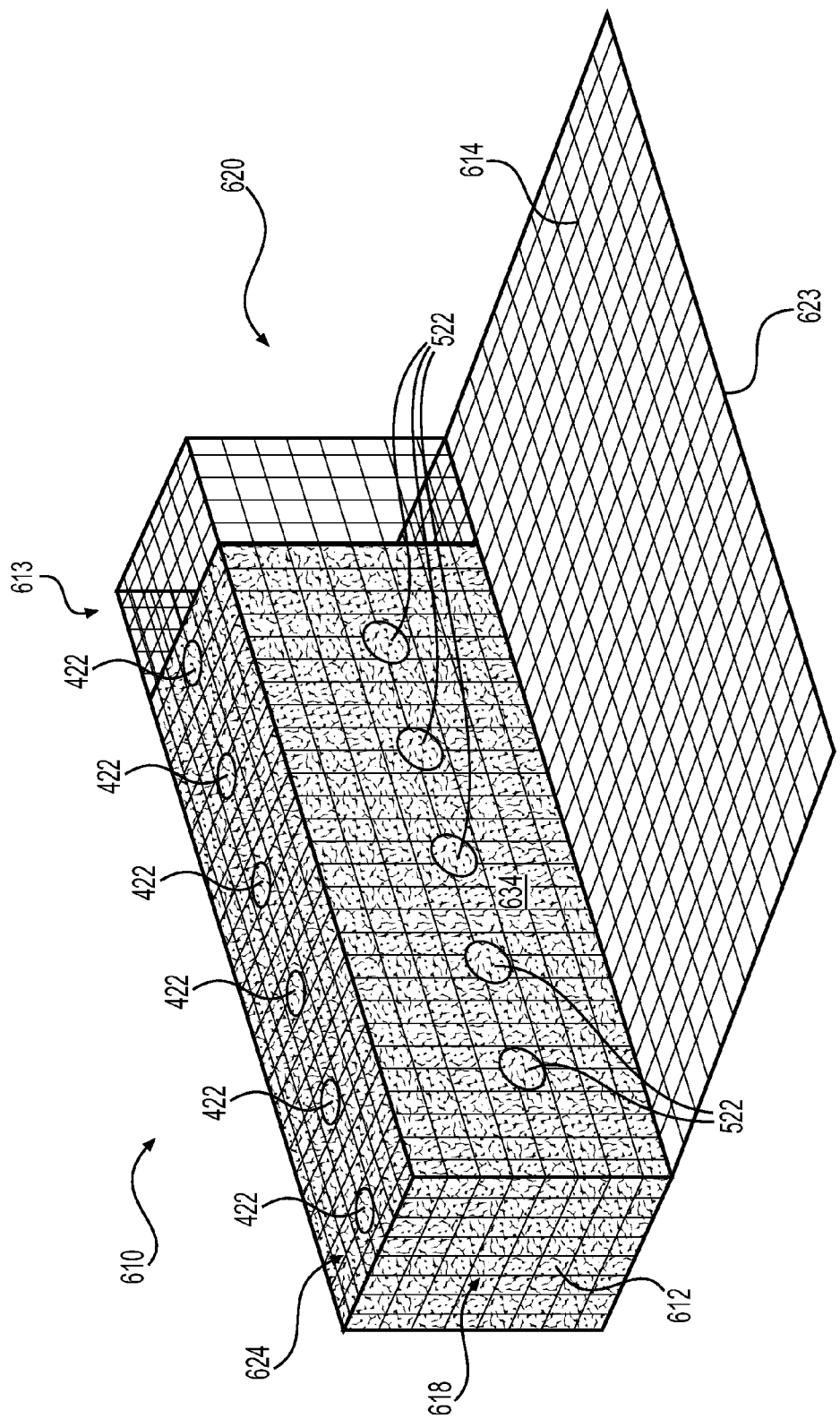
FIG. 23 is a perspective view of a further fiber block planting segment encompassing aspects of the present disclosure.
Figure 24:
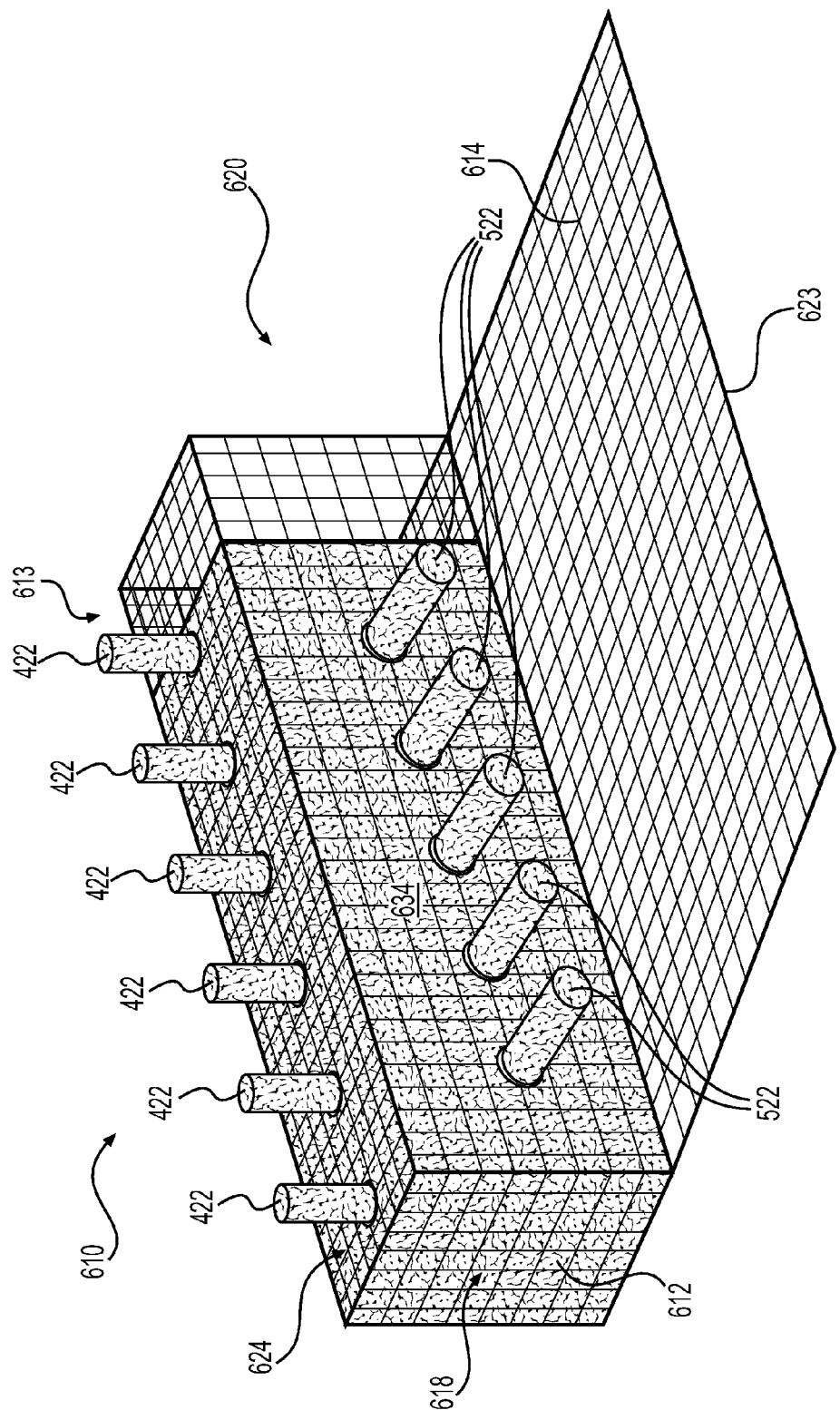
FIG. 24 is a perspective view of the fiber block planting segment of FIG. 23 with the channel plugs partially removed from the channels.
Figure 25:
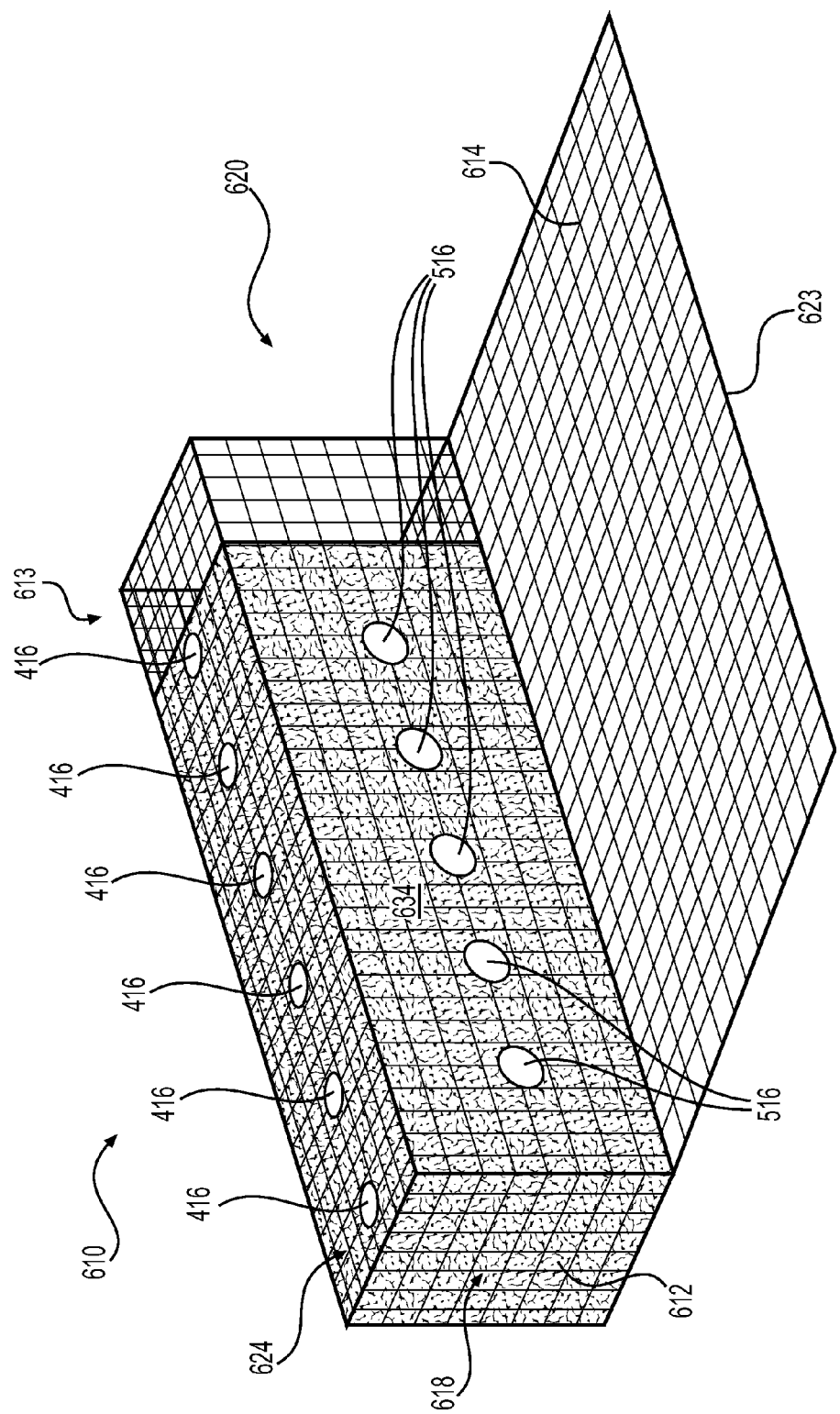
FIG. 25 is a perspective view of the fiber block planting segment shown in FIG. 23 with the channel plugs completely removed from the channels.

As shown in FIGS. 23 and 24, each channel 416 and 516 include a removably aligned channel plug 622 disposed therein. The channel plugs 622 are formed of the same coir material as the fiber block 612, are cylindrical and have a length equal to the length of the channel in which they are disposed, so that the top or bottom of the channel plug is aligned flush with the adjacent outer surface of the fiber block 612 when the channel plug 622 is completely set in the respective channel 416 or 516. The top or bottom of each channel plug 622 can be shaded a different color from the fiber block 612 to aid in the location of the channel plug 622 within the block.

Figure 26:
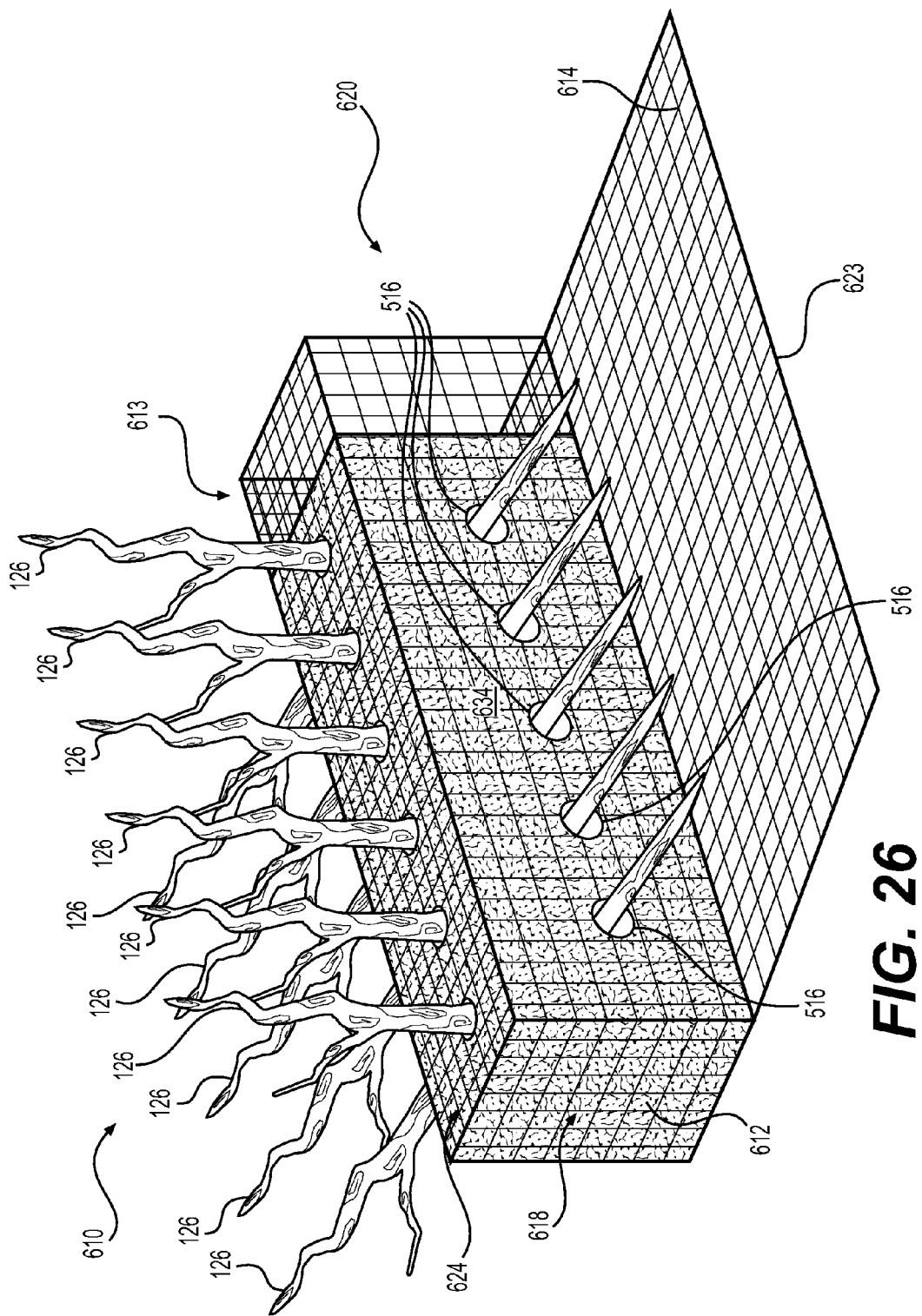
FIG. 26 is a perspective view of the fiber block planting segment shown in FIG. 23 with cuttings of live plants inserted into the channels.

As shown in FIG. 26, cutting of a live plant 126 can be inserted into one of more of the vertical channels 416 and obliquely aligned channels 516 so as to secure the plants 126 to allow them to take root along a bank or shoreline where the fiber block planting segment 610 is installed. The ends of the plants 126 extending out of the rear face 634 of the fiber block 612 would be implanted in the soil overlaid on the anchor flap 623.

Figure 27:
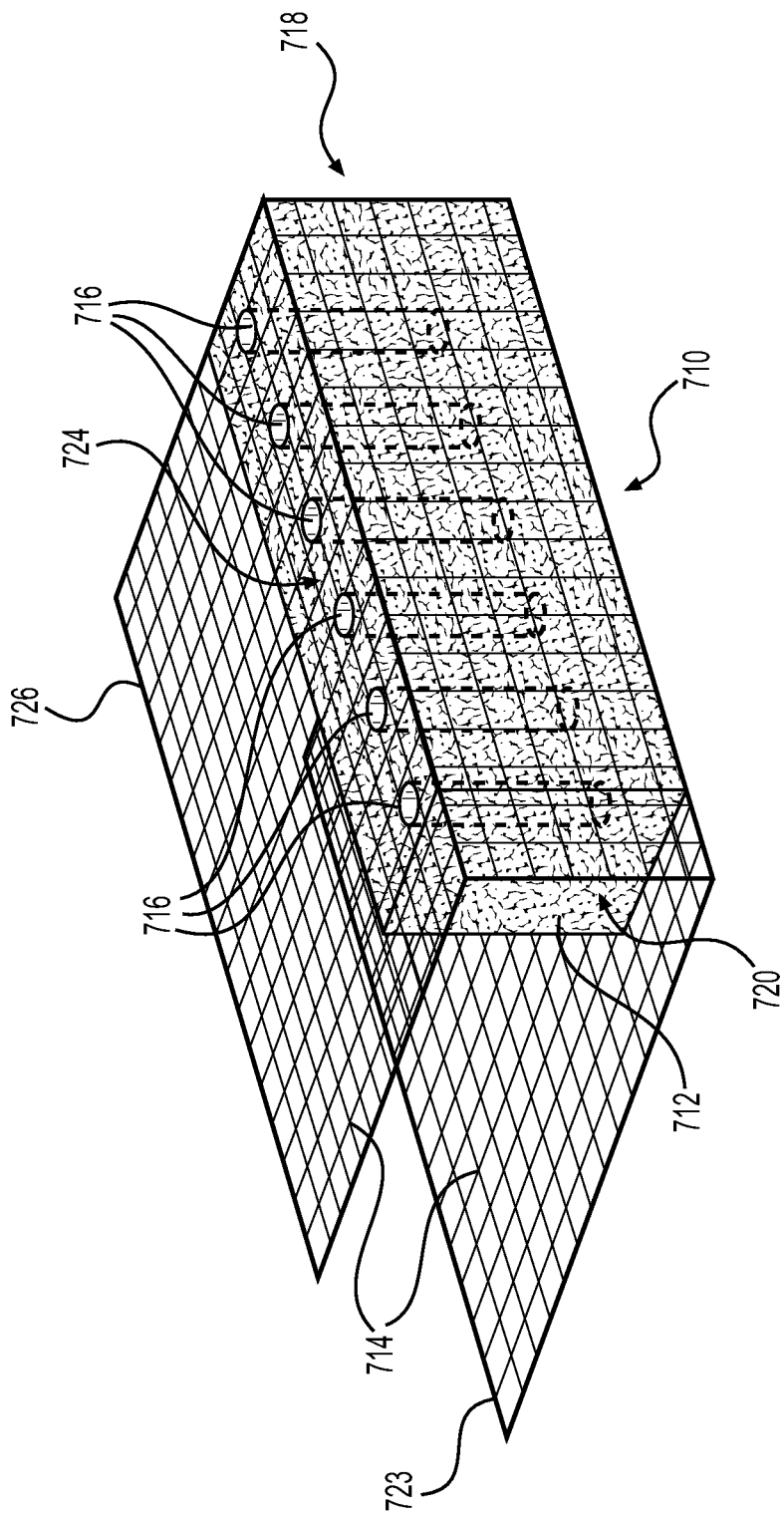
FIG. 27 is a perspective view of yet another fiber block planting segment encompassing aspects of the present disclosure.
Figure 28:
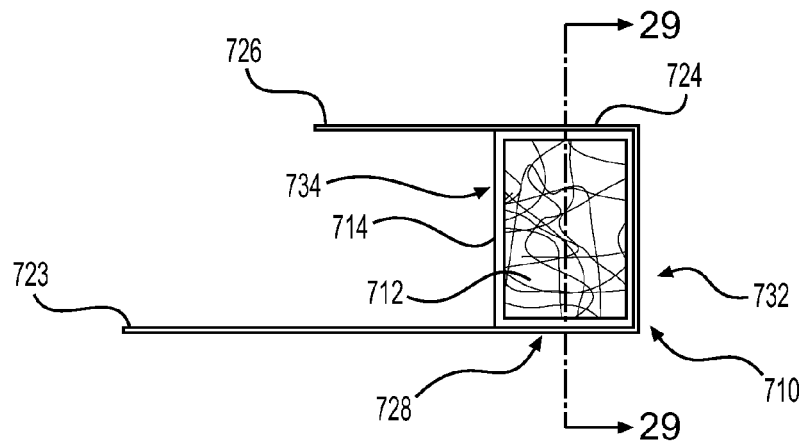
FIG. 28 is a side elevation view of the fiber block planting segment shown FIG. 27.
Figure 29:
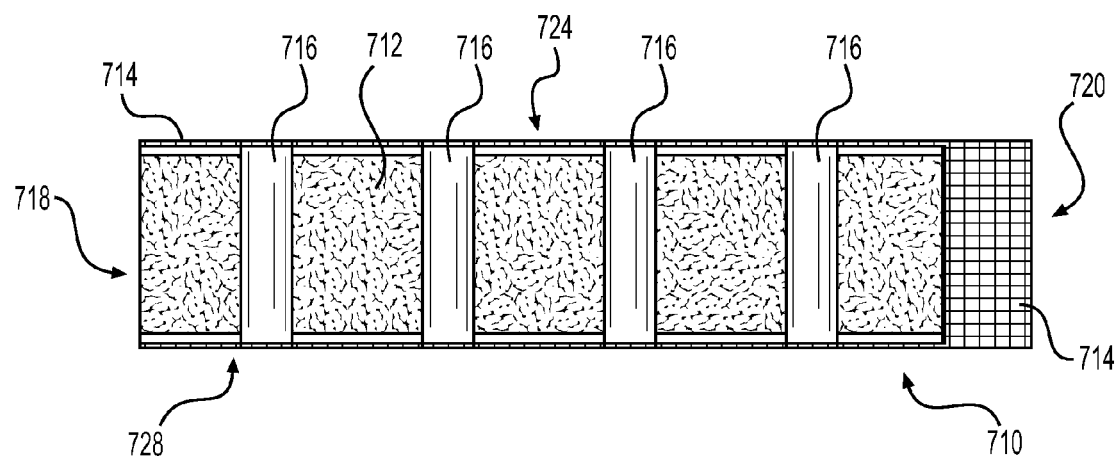
FIG. 29 is a cross-sectional view of the fiber block planting segment shown in FIG. 27 taken along line 29-29 shown in FIG. 28.

FIGS. 27-29 illustrate another fiber block planting segment 710 encompassing aspects of the present disclosure. The fiber block planting segment 710 includes a fiber block 712 made of coir fiber and a coir fiber mesh 714 wrap that encloses the fiber block 712. The wrap includes a bottom anchor flap 723 extending from bottom of the fiber block 712 and a top anchor flap 726 extending over and beyond the top surface 724 of the block 712. The top anchor flap 726 and the bottom anchor flap 723 are aligned to secure the fiber block 712 in place where the fiber block planting segment 710 is installed. Each of the top and bottom anchor flaps 726 and 723 can be secured with stakes or other fasteners and/or dirt, rock, gravel, sand or other weighted material placed thereon to secure the flaps in place. The fiber block 712 includes a plurality of vertically aligned channels 716 formed therein. As shown in FIG. 29, the channels 716 are cylindrical and extend completely through the fiber block 712 and open to the top surface 724 and the bottom surface of the fiber block 712. Each of the channels 716 can have a channel plug removably disposed therein.

Figure 30:
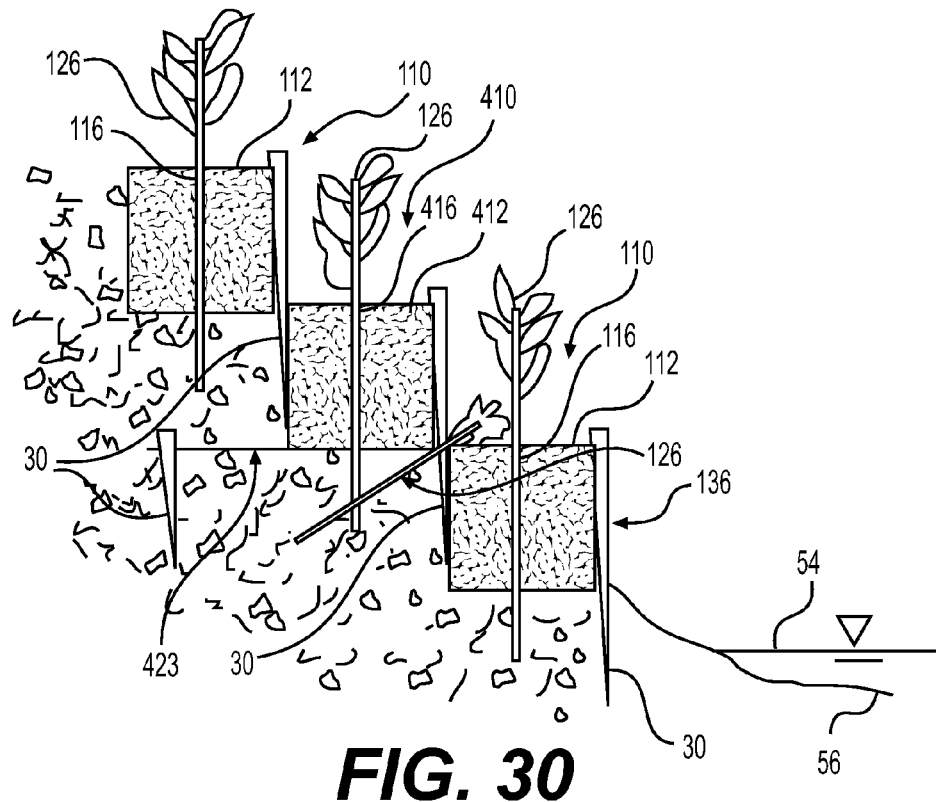
FIG. 30 is a cross-sectional view of a fiber block planting system installation in a waterway bank including fiber block planting segments shown in FIG. 1.
Figure 31:
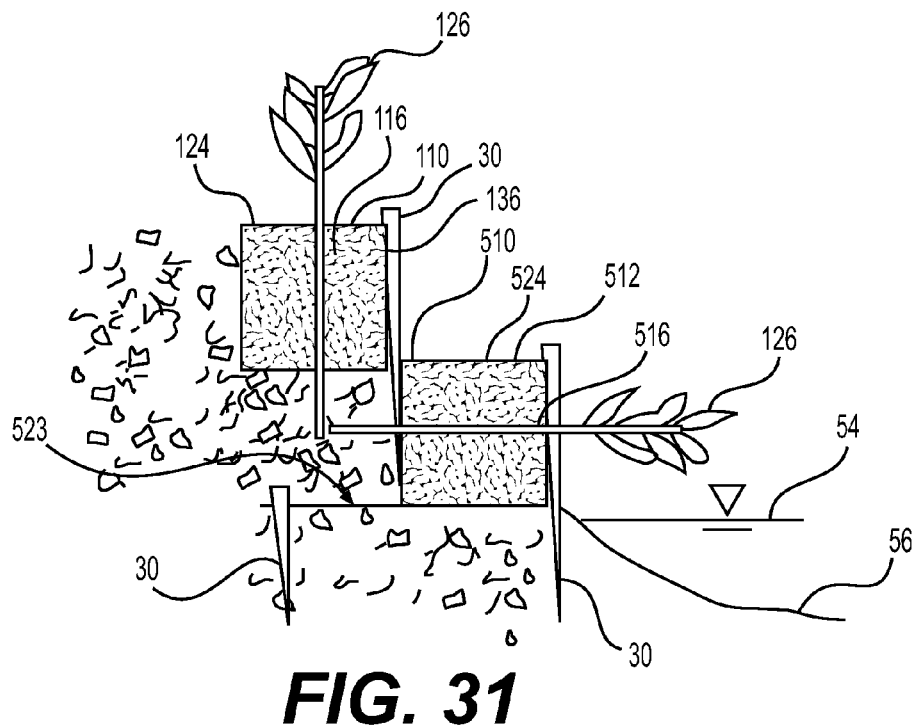
FIG. 31 is a cross-sectional view of another fiber block planting system installation in a waterway bank with fiber block planting segments encompassing aspects of the present disclosure.
Figure 32:
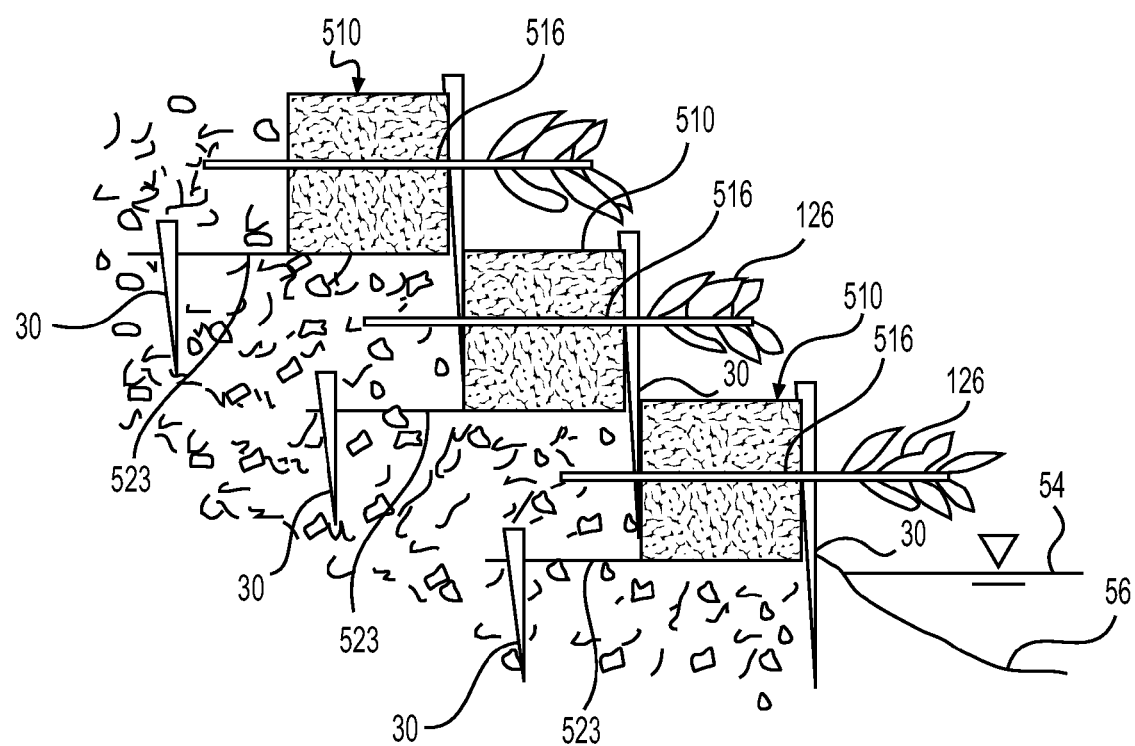
FIG. 32 is a cross-sectional view of yet another fiber block planting system installation in a waterway bank with fiber block planting segments encompassing aspects of the present disclosure.

FIGS. 30-32 illustrate various configurations of the fiber block planting segments encompassed by the present disclosure installed along the bank or shoreline adjacent a body of water to restore an eroded bank or protect a shoreline. As shown in FIG. 30, a fiber block planting system installed along a stream bank is shown comprising at least three different fiber block planting segments. A stream bed 56 contains water that extends to a water line 54. Along the bank adjacent the stream are installed at least three rows of fiber block segments. The lowest row adjacent the water line 54 includes fiber block planting segment 110 that includes a fiber block 112 that has a vertically aligned channel 116 formed therein. A cutting of a live plant 126 is inserted in the channel 116 and secured in place along the stream bank by the fiber block planting segment 110. The top end of the plant 126 extends out of the channel 116 from the top surface of the fiber block and the bottom end of the plant 126 extends of the channel 116 from the bottom surface of the fiber block 112 into the soil along the stream bank. The fiber block planting segment 110 is secured in place by stake 30. The fiber block planting segment 112 secures the plant 126 in place in the soil to allow the cutting time to take root and grow even when the waterline 54 rises and the stream current buffets the stream bank.

In the next row up from the waterline 54, another fiber block planting segment 410 is installed. The fiber block planting segment 410 includes a fiber block 412 in which is disposed a vertically aligned channel 416. The fiber block planting segment 410 also includes a bottom anchor flap 423 extending from the bottom of the fiber block 412 away from the waterline toward the stream bank. The bottom anchor flap 423 is secured in place by both a stake 30 and soil disposed thereon. In the channel 416 is disposed a cutting of a live plant 126 that extends outward from the top of the fiber block 412 and from the bottom of the fiber block into the soil of the stream bank.

In the third row up from the waterline 54 along the stream bank is disposed a third fiber block planting segment 110 that also includes a fiber block 112 having a vertically aligned channel 116 formed therein. Another cutting of a live plant 126 is disposed in the channel 116 and extends through the bottom of the fiber block 112 into the soil below. The fiber block planting segment 110 is also secured in place by a stake 30.

FIG. 31 shows another fiber block planting segment installation along the bank of stream that has a stream bed 56 with a water line 54 there over. The fiber block planting system shown in FIG. 31 includes a fiber block planting segment 510 installed adjacent the waterline 54. The fiber block planting segment 510 includes a fiber block 512 having a top surface 524 and a horizontally aligned channel 516 formed thereon. The channel 516 extends through the entire width of the fiber block 512 and opens to both the front and rear surfaces of the fiber block 512. A cutting of a live plant 126 is inserted horizontally in the channel 516 and extends outward toward the stream at one end and into the soil of the stream bank on the other end. The fiber block planting segment 510 also includes a bottom anchor flap 523 extending from the bottom of the fiber block 512 toward the stream bank. The bottom anchor flap 523 is secured in place by both a stake and soil disposed thereon. In a second row up from the waterline 54 is disposed another fiber block planting segment 110 that includes a fiber block 112 that has a vertically aligned channel 116 formed therein. A cutting of a live plant 126 is inserted completely through the channel 116 and extends outward from the top surface 124 of the fiber block 12 and downward into the soil of the stream bank from the bottom surface of the fiber block 112. The fiber block planting segments 110 and 510 are both secured in place by stakes 30 disposed along the water face of the fiber blocks.

FIG. 32 illustrates yet another fiber block planting system installation along a stream bank. Adjacent the streambed 56 above the waterline 54, three rows of fiber block planting segments 510 are installed. The fiber block planting segments 510 each have horizontally aligned channels 516 in which are disposed cuttings of live plants 126. The cuttings of live plants 126 extend from one end of the fiber block planting segments 510 into the air adjacent the stream and from the opposed end into the soil of the stream bank. The fiber block planting segments 510 are secured by the anchoring of bottom anchor flaps 523 in place by stakes 30 and soil disposed thereon. In the third row up from the waterline 54 is disposed fiber block planting segment 510.

While fiber block planting segments 110 and 510 are shown installed in FIGS. 30-32 it should be understood that each of the various embodiments of the fiber block planting segments shown and described herein and encompassed by the present disclosure can be installed in like manner along a stream bank or shoreline. In each case, one or more channels of the fiber block planting segments can be used to receive a cutting of a live plant or other plant to be planted into the soil of the stream bank or shoreline.

The various alignments of the channels within the fiber blocks and the various configurations of sleeves disclosed herein can be combined in alternative arrangements of fiber block planting systems encompassed by the present disclosure. Other embodiments of the present disclosure will be apparent to those skilled in the art from their consideration of the specification and practice of the present disclosure disclosed in this document. The applicant intends that the specification and examples be considered as exemplary only, with the true scope and spirit of the present disclosure being indicated by the following claims.

The invention claimed is:

1. A fiber block planting system for stabilizing a shoreline or waterway bank comprising:
   a fiber block planting segment comprising:
      an elongated fiber block comprising a top surface, a front surface, a rear surface, a bottom surface, a male end and a female end, wherein the elongated fiber block consists of compressed natural fibers, wherein the elongated fiber block further comprises a plurality of channels formed therein, wherein each channel of the plurality of channels extends completely through the elongated fiber block to at least two separate surfaces selected from the top surface, the front surface, the rear surface, and the bottom surface, and wherein each channel of the plurality of channels comprises a channel length;
      a fiber channel plug removably disposed in a channel of the plurality of channels, wherein the fiber channel plug consists of the compressed natural fibers, wherein the fiber channel plug comprises a plug top, a plug bottom, and a plug length, wherein the plug length is equal to the channel length, wherein the plug top is aligned flush with one of the top surface, the front surface, the rear surface or the bottom surface of the elongated fiber block when the plug bottom is aligned flush with an opposed surface of the elongated fiber block; and,
      a sleeve of fiber mesh encasing at least a portion of the elongated fiber block.

2. The fiber block planting system of claim 1, wherein the fiber block planting segment further comprises an anchor flap extending from the sleeve.

3. The fiber block planting system of claim 1, further comprising a cutting of a live plant disposed in at least one channel of the plurality of channels when the fiber channel plug is removed from the at least one channel.

4. The fiber block planting system of claim 3, wherein a top portion of the cutting of a live plant extends from one surface of the fiber block and bottom portion of the cutting of a live plant extends from another surface of the fiber block.

5. The fiber block planting system of claim 1, wherein the compressed natural fibers comprise coir fibers.

6. The fiber block planting system of claim 1, further comprising a second fiber block planting segment, wherein the second fiber block planting segment comprises a second elongated fiber block comprising a second top surface, a second front surface, a second rear surface, and a second bottom surface, a second male end and a second female end, wherein the second elongated fiber block consists of the compressed natural fibers, wherein the second elongated fiber block further comprises a second plurality of channels formed therein, wherein each channel of the second plurality of channels extends completely through the second elongated fiber block to two separate surfaces selected from the second top surface, the second front surface, the second rear surface, and the second bottom surface, and wherein each channel of the second plurality of channels comprises a second channel length;
   a second fiber channel plug removably disposed in a channel of the second plurality of channels, wherein the second fiber channel plug consists of the compressed natural fibers, wherein the second fiber channel comprises a second plug length a second plug top and a second plug bottom, wherein the second plug length is equal to the second channel length, wherein the second plug top is aligned flush with one of the second top surface, the second front surface, the second rear surface or the second bottom surface of the second elongated fiber block when the second plug bottom is aligned flush with a second opposed surface of the second elongated fiber block; and, a second sleeve of fiber mesh encasing at least a portion of the second elongated fiber block, wherein the male end of the fiber block planting segment is joined to the second female end of the second fiber block planting segment.

7. The fiber block planting system of claim 6, further comprising a cutting of a live plant disposed in at least one channel of the second plurality of channels when the second fiber channel plug is removed from the at least one channel of the second plurality of channels.

8. The fiber block planting system of claim 1, wherein at least one channel of the plurality of channels extends completely through the elongated fiber block to both the top surface and the bottom surface of the elongated fiber block.

9. The fiber block planting system of claim 1, wherein at least one channel of the plurality of channels extends completely through the elongated fiber block to both the front surface and the rear surface of the elongated fiber block.

10. The fiber block planting system of claim 1, wherein a first channel of the plurality of channels extends completely through the elongated fiber block to both the front surface and the rear surface of the elongated fiber block and a second channel of the plurality channels extends completely through the elongated fiber block to both the top surface and the bottom surface of the elongated fiber block.

11. The fiber block planting system of claim 10, wherein the first channel is aligned perpendicular to the second channel.

12. The fiber block planting system of claim 10, wherein the first channel is aligned perpendicular to the top surface of the fiber block.

13. The fiber block planting system of claim 12, wherein the second channel is aligned perpendicular to the front surface of the fiber block.

14. A method of stabilizing a shoreline or waterway bank, comprising the steps of:
  positioning a first fiber block planting segment adjacent a shoreline or a waterway bank, the first fiber block planting segment comprising an elongated first fiber block consisting of compressed natural fibers, wherein the elongated first fiber block comprises a first top surface, a first bottom surface, a first front surface, a first rear surface, a first male end portion, and a first female end portion disposed opposite the first male end portion, wherein the elongated first fiber block further comprises a first plurality of channels formed therein, wherein each channel of the first plurality of channels extends completely through the elongated first fiber block to two surfaces of the first top surface, the first bottom surface, the first front surface and the first rear surface, a first plurality of fiber channel plugs, wherein each fiber channel plug of the first plurality of fiber channel plugs consists of the compressed natural fibers and is removably disposed in one channel of the first plurality of channels, and wherein the a first mesh sleeve encasing at least a portion of the first fiber block;
  positioning a second fiber block planting segments adjacent the shoreline or waterway bank, the second fiber block planting segment comprising an elongated second fiber block consisting of the compressed natural fibers and defining a second top surface, a second bottom surface, a second front surface, a second rear surface, a second male end portion, and a second female end portion disposed opposite the second male end portion, wherein the elongated second fiber block comprises a second plurality of channels formed therein, wherein each channel of the second plurality of channels extends completely through the elongated second fiber block to two surfaces of the second top surface, the second bottom surface, the second front surface and the second rear surface, a second plurality of fiber channel plugs, wherein each fiber channel plug of the second plurality of fiber channel plugs consists of the compressed natural fibers and is removably disposed in one channel of the second plurality of channels, a second mesh sleeve encasing at least a portion of the second fiber block;
  mating the second male end portion of the elongated second fiber block to the first female end portion of the elongated first fiber block;
  removing at least one fiber channel plug of the first plurality and the second plurality of fiber channel plugs from at least one channel of the first plurality and the second plurality of channels; and,
  inserting a cutting of a live plant into the channel from which the fiber channel plug was removed.

15. The method of claim 14, further comprising anchoring both the elongated first and the second fiber block plant segments to the shoreline or waterway bank.

* * * * *

UNITED STATES PATENT AND TRADEMARK OFFICE
CERTIFICATE OF CORRECTION

PATENT NO. : 9,315,962 B2  
APPLICATION NO. : 14/594931  
DATED : April 19, 2016  
INVENTOR(S) : B. Lanka Santha Page 1 of 1

It is certified that error appears in the above-identified patent and that said Letters Patent is hereby corrected as shown below:

Claims

Column 14, line 2, claim 14, delete "the"; and, "encasing" should be changed to --encases--.

Signed and Sealed this  
Second Day of August, 2016

Michelle K. Lee  
*Director of the United States Patent and Trademark Office*